(12) United States Patent
Abiko et al.

(10) Patent No.: US 11,332,578 B2
(45) Date of Patent: May 17, 2022

(54) POLYIMIDE RESIN, POLYIMIDE RESIN COMPOSITION, AND POLYIMIDE FILM

(71) Applicant: MITSUBISHI GAS CHEMICAL COMPANY, INC., Tokyo (JP)

(72) Inventors: Yohei Abiko, Kanagawa (JP); Shuya Suenaga, Kanagawa (JP); Shinji Sekiguchi, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 17 days.

(21) Appl. No.: 16/096,920

(22) PCT Filed: May 1, 2017

(86) PCT No.: PCT/JP2017/017156
§ 371 (c)(1),
(2) Date: Oct. 26, 2018

(87) PCT Pub. No.: WO2017/191830
PCT Pub. Date: Nov. 9, 2017

(65) Prior Publication Data
US 2019/0202988 A1    Jul. 4, 2019

(30) Foreign Application Priority Data

May 2, 2016 (JP) .............................. JP2016-092590

(51) Int. Cl.
*C08G 73/10* (2006.01)
*C08K 3/22* (2006.01)
*C08J 5/18* (2006.01)

(52) U.S. Cl.
CPC ..... *C08G 73/1042* (2013.01); *C08G 73/1039* (2013.01); *C08G 73/1082* (2013.01); *C08J 5/18* (2013.01); *C08K 3/22* (2013.01); *C08J 2377/06* (2013.01); *C08K 2003/2227* (2013.01); *C08K 2201/003* (2013.01); *C08K 2201/005* (2013.01); *C08K 2201/011* (2013.01); *Y10T 428/31721* (2015.04)

(58) Field of Classification Search
CPC ............ C08G 73/1039; C08G 73/1042; C08G 73/1082; C08J 5/18; C08K 3/22; C08L 79/08
USPC ......................................................... 524/430
See application file for complete search history.

(56) References Cited

U.S. PATENT DOCUMENTS

| | | | | |
|---|---|---|---|---|
| 2003/0049193 A1* | 3/2003 | Satsu | ..................... | H01L 23/293 423/325 |
| 2004/0099374 A1* | 5/2004 | Kanakarajan | ........... | B32B 15/08 156/345.1 |
| 2004/0197699 A1* | 10/2004 | Nakayama | .............. | C08L 79/08 430/270.1 |
| 2008/0044684 A1* | 2/2008 | Chan | .................... | B29B 17/0042 428/626 |
| 2009/0160089 A1* | 6/2009 | Oishi | ...................... | B29C 55/04 264/289.6 |
| 2009/0247717 A1 | 10/2009 | Liaw | | |
| 2010/0279131 A1* | 11/2010 | Park | ........................ | C08L 79/08 428/473.5 |
| 2011/0059305 A1 | 3/2011 | Kaneya et al. | | |
| 2011/0284855 A1* | 11/2011 | Miyoshi | ................... | C08K 5/17 257/59 |
| 2014/0238594 A1* | 8/2014 | Yoon | ........................ | G02B 1/10 156/280 |
| 2016/0137789 A1* | 5/2016 | Suenaga | ............ | C08G 73/1042 428/220 |
| 2017/0165879 A1 | 6/2017 | Miyamoto et al. | | |

FOREIGN PATENT DOCUMENTS

| | | |
|---|---|---|
| CN | 101959935 | 1/2011 |
| CN | 105461923 A | 4/2016 |
| JP | 2009-242395 A | 10/2009 |
| JP | 2009-256666 A | 11/2009 |
| JP | 2010-180292 A | 8/2010 |
| KR | 10-2014-0086755 A | 7/2014 |
| KR | 10-2015-0016737 A | 2/2015 |
| WO | 2008/091011 A1 | 7/2008 |
| WO | 2011/033751 A1 | 3/2011 |
| WO | WO 2015/002273  * | 1/2015 |
| WO | 2015-122032 | 8/2015 |
| WO | 2016-010003 | 1/2016 |
| WO | 2016/052323 A1 | 4/2016 |
| WO | 2016/143580 A1 | 9/2016 |

OTHER PUBLICATIONS

Kim, Optically transparent and colorless polyimide hybrid films with various clay contents, Macromolecular Research, vol. 20, No. 12, pp. 1257-1263 (2012) (Year: 2012).*
Kim et al., "Optically Transparent and Colorless Polyimide Hybrid Films with Various Clay Contents", Macromolecular Research, 2012, pp. 1527-1263, vol. 20, No. 12.
Yi, "Soluble and Color Polyimides From Alicyclic Diamines", J.M.S. Pure Appl. Chem., pp. 2009-2022.
International Search Report in International Patent Application No. PCT/JP2017/017156, dated Jun. 6, 2017.
International Preliminary Report on Patentability in International Patent Application No. PCT/JP2017/017156, dated Nov. 6, 2018.

* cited by examiner

Primary Examiner — Doris L Lee
(74) Attorney, Agent, or Firm — Greenblum & Bernstein, P.L.C.

(57) ABSTRACT

The present invention is directed to a polyimide resin comprising a structural unit A derived from a tetracarboxylic dianhydride and a structural unit B derived from a diamine, wherein the structural unit A contains a structural unit (A-1) derived from 4,4'-(hexafluoroisopropylidene)diphthalic anhydride, and the structural unit B contains a structural unit derived from an aliphatic diamine, a polyimide resin composition comprising the polyimide resin and inorganic nanoparticles, and a polyimide film comprising the polyimide resin or the polyimide resin composition. Provided are a polyimide resin and a polyimide resin composition, each of which can form a film having not only a heat resistance, and colorlessness and transparency but also low water absorption properties, and a polyimide film.

18 Claims, 1 Drawing Sheet

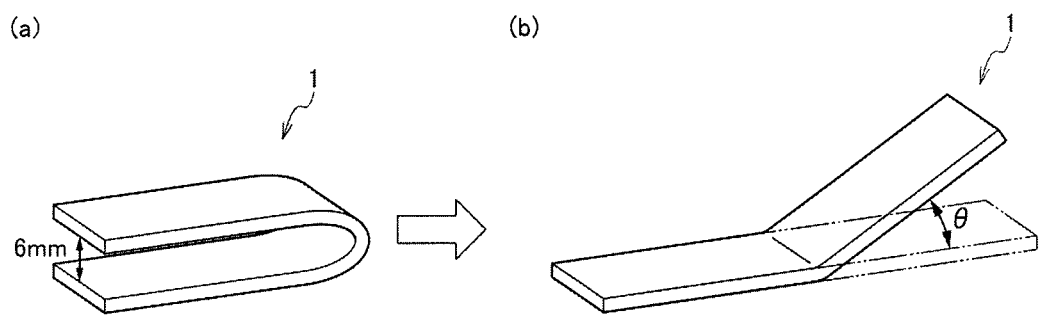

POLYIMIDE RESIN, POLYIMIDE RESIN COMPOSITION, AND POLYIMIDE FILM

TECHNICAL FIELD

The present invention relates to a polyimide resin, a polyimide resin composition, and a polyimide film containing the polyimide resin or the polyimide resin composition.

BACKGROUND ART

Generally, a polyimide resin is obtained from an aromatic tetracarboxylic anhydride and an aromatic diamine, and the molecules of polyimide have rigidity, resonance stabilization, and strong chemical bonding, and hence the polyimide resin has excellent heat resistance, chemical resistance, mechanical physical properties, and electric properties. Therefore, the polyimide resin has been widely used in the fields of molding materials, composite materials, electric or electronic parts, optical materials, displays, aircraft and aerospace, and the like.

However, conventional polyimide resins typically have high water absorption ratio, and have a problem, for example, in that the polyimide resin is poor in dimensional stability upon absorbing moisture in the use as a thin layer.

PTL 1 discloses that a polyimide resin produced using an ester group-containing aromatic tetracarboxylic dianhydride exhibits a low water absorption ratio.

PTL 2 discloses that a polyimide resin produced using an aromatic diamine compound exhibits a low water absorption ratio, wherein the aromatic diamine compound has a structure in which aromatic rings constituting the aromatic diamine compound are bonded through a single bond and an amide linkage, and the single bond, an amide linkage, and an amino group are bonded at the para-position.

Further, a film obtained from a polyimide resin as a material is required to have even higher transparency.

CITATION LIST

Patent Literature

PTL 1: WO2008/091011
PTL 2: JP-A-2010-180292

SUMMARY OF INVENTION

Technical Problem

However, it is difficult for the polyimide resins disclosed in PTLs 1 and 2 to achieve all the heat resistance, colorlessness and transparency, and low water absorption properties.

Accordingly, an object to be achieved by the present invention is to provide a polyimide resin and a polyimide resin composition, each of which can form a film having not only a heat resistance and colorlessness and transparency but also low water absorption properties, and a polyimide film containing the polyimide resin or the polyimide resin composition.

Solution to Problem

The inventors have conducted intensive and extensive studies. As a result, it has been found that a polyimide resin containing specific structural units and a polyimide resin composition containing the polyimide resin can form a film which is excellent in heat resistance, colorlessness and transparency, and low water absorption properties. Based on the above findings, the present invention has been completed. Specifically, the present invention is directed to the following items [1] to [3].

[1] A polyimide resin containing a structural unit A derived from a tetracarboxylic dianhydride and a structural unit B derived from a diamine,
wherein the structural unit A contains a structural unit (A-1) derived from a compound represented by the following formula (a-1), and
the structural unit B contains a structural unit derived from an aliphatic diamine:

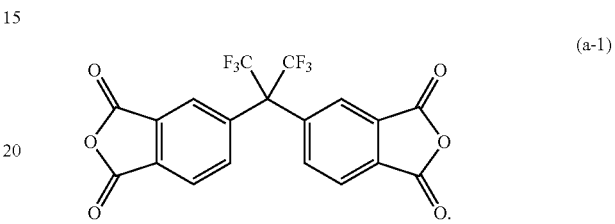

(a-1)

[2] A polyimide resin composition containing the above-mentioned polyimide resin and inorganic nanoparticles.

[3] A polyimide film containing the above-mentioned polyimide resin or the above-mentioned polyimide resin composition.

Advantageous Effects of Invention

According to the present invention, there can be provided a polyimide resin and a polyimide resin composition, each of which can form a film having not only a heat resistance, and colorlessness and transparency but also low water absorption properties, and a polyimide film containing the polyimide resin or the polyimide resin composition.

BRIEF DESCRIPTION OF DRAWING

FIG. 1 is a diagrammatic view showing the method for measuring a deformation recovery of a polyimide film.

DESCRIPTION OF EMBODIMENTS

The polyimide resin of the present invention is a polyimide resin containing a structural unit A derived from a tetracarboxylic dianhydride and a structural unit B derived from a diamine, wherein the structural unit A contains a structural unit (A-1) derived from a compound represented by the following formula (a-1), and the structural unit B contains a structural unit derived from an aliphatic diamine.

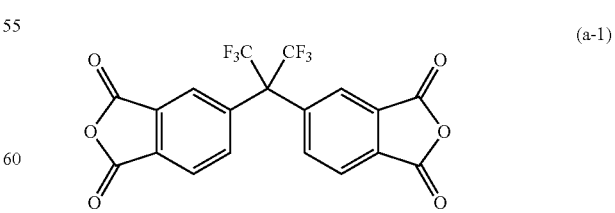

(a-1)

In the present invention, the term "aliphatic diamine" means a diamine having each amino group directly bonded to an aliphatic group, and optionally having in part of the structure thereof an aliphatic group, an alicyclic group, an aromatic group, or the other substituents and optionally having at least one functional group selected from the group consisting of a carboxy group, a hydroxy group, and a carbonyl group. The term "alicyclic diamine" means a diamine having each amino group directly bonded to an alicyclic group, and optionally having in part of the structure thereof an aliphatic group, an alicyclic group, an aromatic group, or the other substituents and optionally having at least one functional group selected from the group consisting of a carboxy group, a hydroxy group, and a carbonyl group. The term "aromatic diamine" means a diamine having each amino group directly bonded to an aromatic ring, and optionally having in part of the structure thereof an aliphatic group, an alicyclic group, an aromatic group, or the other substituents. For example, 1,3- or 1,4-bis(aminomethyl) cyclohexane and metaxylylenediamine have an amino group directly bonded to an aliphatic group (methylene group), and therefore are aliphatic diamines.

Hereinbelow, the polyimide resin of the present invention will be described.

[Structural Unit A]

The structural unit A contained in the polyimide in the present invention is a structural unit derived from a tetracarboxylic dianhydride. The tetracarboxylic dianhydrides may be used singly or in combination of two or more thereof.

The structural unit A contains a structural unit (A-1) derived from a compound represented by the above formula (a-1). Since the structural unit A contains the structural unit (A-1), the low water absorption properties and transparency are improved and excellent deformation recovery is achieved. In the present invention, the deformation recovery indicates the degree of recovery from the state of a sheet of film being bent to the original state as shown in FIG. 1, and is measured by the method described in the Examples.

The proportion of the structural unit (A-1) in the structural unit A is preferably 30 to 100 mol %, more preferably 40 to 100 mol %, further preferably 50 to 100 mol %, still further preferably 60 to 100 mol %, still further preferably 80 to 100 mol %.

From the viewpoint of the heat resistance, mechanical physical properties (modulus), and organic solvent resistance, the structural unit A may contain a structural unit (A-2) derived from a compound represented by the following formula (a-2).

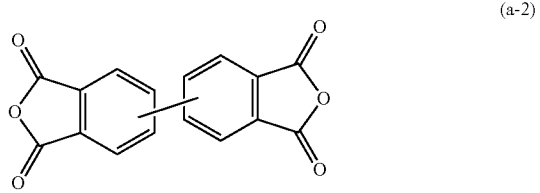

(a-2)

Examples of the compound represented by the formula (a-2) include 3,3',4,4'-biphenyltetracarboxylic dianhydride (s-BPDA) represented by the following formula (a-2-1), 2,3,3',4'-biphenyltetracarboxylic dianhydride (a-BPDA) represented by the following formula (a-2-2), and 2,2',3,3'-biphenyltetracarboxylic dianhydride (i-BPDA) represented by the following formula (a-2-3). Of these, 3,3',4,4'-biphenyltetracarboxylic dianhydride represented by the following formula (a-2-1) is preferred. The compounds represented by the formula (a-2) may be used singly or in combination of two or more thereof.

s-BPDA is preferred in view of the organic solvent resistance, and a-BPDA and i-BPDA are preferred in view of the heat resistance and solution processability.

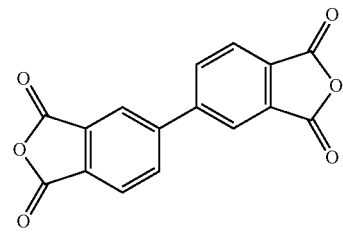

(a-2-1)

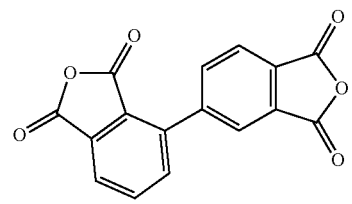

(a-2-2)

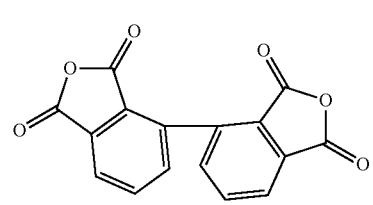

(a-2-3)

From the viewpoint of the low water absorption properties, transparency, and deformation recovery, the proportion of the structural unit (A-2) in the structural unit A is preferably 70 mol % or less, more preferably 60 mol % or less, further preferably 50 mol % or less, still further preferably 40 mol % or less, still further preferably 20 mol % or less.

When the structural unit A contains the structural unit (A-2), from the viewpoint of the low water absorption properties and transparency, the molar ratio of the structural unit (A-1) and the structural unit (A-2) is preferably 30:70 to 99:1, more preferably 40:60 to 95:5, further preferably 40:60 to 90:10, still further preferably 50:50 to 85:15, still further preferably 50:50 to 80:20.

From the viewpoint of the colorlessness and transparency and heat resistance, the structural unit A may contain a structural unit (A-3) derived from a compound represented by the following formula (a-3).

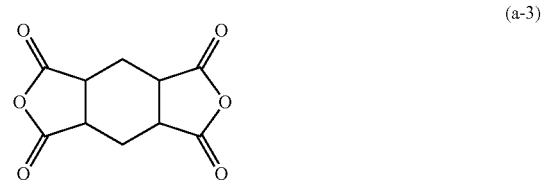

(a-3)

From the viewpoint of the low water absorption properties, organic solvent resistance, and deformation recovery, the proportion of the structural unit (A-3) in the structural unit A is preferably 40 mol % or less, more preferably 30 mol % or less, further preferably 20 mol % or less.

When the structural unit A contains the structural unit (A-3), from the viewpoint of the low water absorption properties, organic solvent resistance, and deformation recovery, the molar ratio of the structural unit (A-1) and the structural unit (A-3) is preferably 60:40 to 99:1, more preferably 70:30 to 95:5, further preferably 80:20 to 90:10.

From the viewpoint of the colorlessness and transparency and heat resistance, the structural unit A may contain a structural unit (A-4) derived from a compound represented by the following formula (a-4).

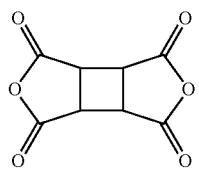

(a-4)

From the viewpoint of the low water absorption properties, organic solvent resistance, and deformation recovery, the proportion of the structural unit (A-4) in the structural unit A is preferably 60 mol % or less, more preferably 50 mol % or less, further preferably 40 mol % or less, still further preferably 20 mol % or less.

When the structural unit A contains the structural unit (A-4), from the viewpoint of the low water absorption properties, the molar ratio of the structural unit (A-1) and the structural unit (A-4) is preferably 40:60 to 99:1, more preferably 50:50 to 95:5, further preferably 40:60 to 90:10, further preferably 80:20 to 90:10.

When at least one selected from the group consisting of the structural units (A-2) to (A-4) is contained as the structural unit A constituting the polyimide resin of the present invention, from the viewpoint of the low water absorption properties, transparency, deformation recovery, or mechanical strength (tensile modulus or tensile strength), the proportion of the total of the structural units (A-2) to (A-4) in the structural unit A is preferably 70 mol % or less, more preferably 60 mol % or less, further preferably 50 mol % or less.

From the viewpoint of the low water absorption properties, transparency, and deformation recovery, the proportion of the total of the structural units (A-1) to (A-4) in the structural unit A constituting the polyimide resin of the present invention is preferably 70 to 100 mol %, more preferably 85 to 100 mol %, further preferably 99 to 100 mol %, still further preferably 100 mol %.

The polyimide resin of the present invention may contain in the structural unit A a structural unit derived from a tetracarboxylic dianhydride other than the compounds represented by the above formulae (a-1) to (a-4) as a structural unit other than the structural units (A-1) to (A-4) as long as the effects of the present invention are not impaired.

Examples of tetracarboxylic dianhydrides other than the above formulae (a-1) to (a-4) include 1,2,3,4-butanetetracarboxylic dianhydride, 1,2,3,4-pentanetetracarboxylic dianhydride, 1,2,4,5-cyclopentanetetracarboxylic dianhydride, bicyclo[2.2.2]oct-7-ene-2,3,5,6-tetracarboxylic dianhydride, dicyclohexyltetracarboxylic dianhydride and position isomers thereof, pyromellitic anhydride, 2,3,5,6-toluenetetracarboxylic dianhydride, and 1,4,5,8-naphthalenetetracarboxylic dianhydride. These may be used singly or in combination of two or more thereof.

[Structural Unit B]

The structural unit B contained in the polyimide in the present invention is a structural unit derived from a diamine. The diamines may be used singly or in combination of two or more thereof.

The structural unit B contained in the polyimide in the present invention contains a structural unit derived from an aliphatic diamine, preferably contains a structural unit derived from a diamine having an alicyclic group. By virtue of the above-mentioned structural unit contained, the low water absorption properties, organic solvent resistance, and transparency are improved and excellent deformation recovery is achieved.

The "alicyclic group" is a divalent aliphatic hydrocarbon group having a structure in which carbon atoms are bonded together into a ring form. Examples of diamines having an alicyclic group include the alicyclic diamines and aliphatic diamines having an alicyclic group in part of the structure thereof described later.

The aliphatic diamine preferably has 2 to 15 carbon atoms, more preferably 4 to 12 carbon atoms, further preferably 6 to 8 carbon atoms.

The diamine having an alicyclic group preferably has 4 to 15 carbon atoms, more preferably 6 to 12 carbon atoms, further preferably 6 to 8 carbon atoms.

The structural unit derived from an aliphatic diamine is preferably at least one selected from the group consisting of a structural unit (B-1) derived from a compound represented by the following formula (b-1), a structural unit (B-2) derived from the following formula (b-2), and a structural unit (B-3) derived from a compound represented by the following formula (b-3). Since the structural unit B contains at least one selected from the group consisting of the structural units (B-1) and (B-2), the low water absorption properties, organic solvent resistance, and transparency are improved and excellent deformation recovery is achieved. Since the structural unit B contains the structural unit (B-3), the low water absorption properties, mechanical physical properties (modulus), and transparency are improved and excellent deformation recovery is achieved.

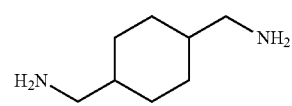

(b-1)

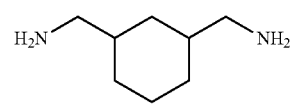

(b-2)

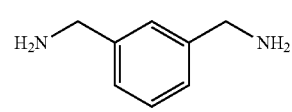

(b-3)

From the viewpoint of the organic solvent resistance and heat resistance, each of the compounds represented by the formulae (b-1) and (b-2) preferably has a cis:trans ratio of 0:100 to 100:0, more preferably 0:100 to 80:20, further preferably 0.1:99.9 to 70:30, still further preferably 0.5:99.5 to 60:40, still further preferably 1:99 to 20:80.

From the viewpoint of the low water absorption properties, organic solvent resistance, deformation recovery, and transparency, the proportion of the total of the structural units derived from an aliphatic diamine in the structural unit B of the polyimide resin is preferably 10 to 100 mol %, more preferably 20 to 100 mol %, further preferably 20 to 90 mol %, still further preferably 40 to 80 mol %, still further preferably 50 to 80 mol %.

From the viewpoint of the low water absorption properties, organic solvent resistance, deformation recovery, and transparency, the proportion of the total of the structural units (B-1), (B-2), and (B-3) in the structural units derived from an aliphatic diamine is preferably 60 mol % or more, more preferably 80 mol % or more, further preferably 90 mol % or more, still further preferably 100 mol %.

The polyimide resin of the present invention may contain in the structural unit B a structural unit derived from a diamine other than aliphatic diamines as long as the effects of the present invention are not impaired.

Examples of the diamines other than aliphatic diamines include the aromatic diamines described later. For example, from the viewpoint of the heat resistance and mechanical physical properties, the structural unit B preferably contains a structural unit (B-4) derived from a compound represented by the following formula (b-4).

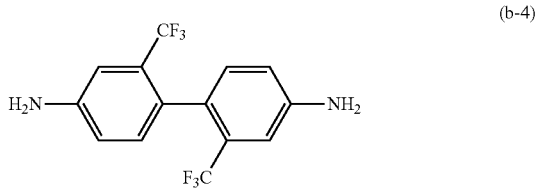

(b-4)

From the viewpoint of the low water absorption properties, organic solvent resistance, and deformation recovery, the proportion of the structural unit (B-4) in the structural unit B is preferably 90 mol % or less, more preferably 80 mol % or less, further preferably 50 mol % or less. Further, from the viewpoint of the heat resistance and mechanical physical properties, the proportion of the structural unit (B-4) in the structural unit B is preferably 10 mol % or more, more preferably 20 mol % or more.

When the structural unit B contains the structural unit (B-4), from the viewpoint of the low water absorption properties, organic solvent resistance, and deformation recovery, the molar ratio of the structural unit derived from an aliphatic diamine and the structural unit (B-4) is preferably 10:90 to 99:1, more preferably 20:80 to 90:10, further preferably 40:60 to 85:15.

The content of the total of the structural unit derived from an aliphatic diamine and the structural unit (B-4) in the structural unit B constituting the polyimide resin of the present invention is preferably 70 to 100 mol %, more preferably 85 to 100 mol %, further preferably 99 to 100 mol %, still further preferably 100 mol %.

[Combination of the Structural Unit A and the Structural Unit B]

In the case where the proportion of the structural unit (A-1) in the structural unit A is more than 90 mol % and 100 mol % or less, with respect to examples of the structural unit B, at least one selected from the group consisting of the structural units (B-1) and (B-3) and the structural unit (B-4) are preferably contained, and the structural unit (B-1) and the structural unit (B-4) are more preferably contained. By virtue of the above-mentioned combination of the structural unit A and the structural unit B, the low water absorption properties are improved and excellent light transmittance and deformation recovery are achieved.

In the above example of the combination, from the viewpoint of the low water absorption properties, light transmittance, and deformation recovery, the molar ratio of the at least one selected from the group consisting of the structural units (B-1) and (B-3) and the structural unit (B-4) is preferably 10:90 to 90:10, more preferably 15:85 to 85:15, further preferably 20:80 to 80:20.

In the case where the proportion of the structural unit (A-1) in the structural unit A is 90 mol % or less, preferably 40 to 90 mol %, more preferably 50 to 80 mol %, with respect to examples of the structural unit A other than the structural unit (A-1), at least one selected from the group consisting of the structural units (A-2), (A-3), and (A-4) is preferably contained, at least one selected from the group consisting of the structural units (A-2) and (A-4) is more preferably contained, and the structural unit (A-2) is further preferably contained. With respect to examples of the structural unit B, at least one selected from the group consisting of the structural units (B-1) and (B-2) is preferably contained, and at least one selected from the group consisting of the structural units (B-1) and (B-2) and the structural unit (B-4) are more preferably contained. By virtue of the above-mentioned combination of the structural unit A and the structural unit B, excellent light transmittance, deformation recovery, and mechanical strength (tensile modulus and tensile strength) as well as excellent low water absorption properties and organic solvent resistance are achieved.

In the above example of the combination, from the viewpoint of the low water absorption properties, light transmittance, organic solvent resistance, and deformation recovery, the molar ratio of the at least one selected from the group consisting of the structural units (B-1) and (B-2) and the structural unit (B-4) is preferably 20:80 to 100:0, preferably 30:70 to 95:5, more preferably 40:60 to 90:10, further preferably 50:50 to 80:20.

[Method for Producing the Polyimide Resin]

The polyimide resin can be obtained by reacting a diamine component and a tetracarboxylic acid component with each other.

Examples of the tetracarboxylic acid component include tetracarboxylic acids and derivatives thereof. The tetracarboxylic acid components may be used singly or in combination of two or more thereof.

Examples of derivatives of the tetracarboxylic acids include anhydrides or alkyl esters of the tetracarboxylic acids.

With respect to the alkyl esters of the tetracarboxylic acids, preferred are those in which the alkyl has 1 to 3 carbon atoms, and examples of such alkyl esters include dimethyl esters, diethyl esters, and dipropyl esters of the tetracarboxylic acids.

The tetracarboxylic acid component essentially contains 4,4'-(hexafluoroisopropylidene)diphthalic acid or a derivative thereof, and preferably contains 4,4'-(hexafluoroisopropylidene)diphthalic anhydride [the above formula (a-1)].

Further, the tetracarboxylic acid component preferably contains at least one selected from the group consisting of biphenyltetracarboxylic acid and a derivative thereof, 1,2,4,5-cyclohexanetetracarboxylic acid and a derivative thereof, and 1,2,3,4-cyclobutanetetracarboxylic acid and a derivative thereof, more preferably contains at least one selected from the group consisting of biphenyltetracarboxylic dianhydride [the above formula (a-2)], 1,2,4,5-cyclohexanetetracarboxylic dianhydride [the above formula (a-3)], and 1,2,3,4-cyclobutanetetracarboxylic dianhydride [the above formula (a-4)], and further preferably contains at least one selected from the group consisting of 3,3',4,4'- biphenyltetracarboxylic dianhydride [the above formula (a-2-1)] and 1,2,3,4-cyclobutanetetracarboxylic dianhydride [the above formula (a-4)].

Examples of tetracarboxylic acid components other than those mentioned above include aromatic tetracarboxylic acids and derivatives thereof, such as pyromellitic acid, 2,3,5,6-toluenetetracarboxylic acid, and 1,4,5,8-naphthalenetetracarboxylic acid; tetracarboxylic acids containing an alicyclic hydrocarbon group and derivatives thereof, such as 1,2,4,5-cyclopentanetetracarboxylic acid, bicyclo[2.2.2]oct-7-ene-2,3,5,6-tetracarboxylic acid, dicyclohexyltetracarboxylic acid and position isomers thereof; and 1,2,3,4-butanetetracarboxylic acid, 1,2,3,4-pentanetetracarboxylic acid, and position isomers thereof and derivatives thereof. These may be used singly or in combination of two or more thereof.

The amount of the above tetracarboxylic acid component used is preferably 20 mol % or less, more preferably 10 mol % or less, further preferably 1 mol % or less, still further preferably 0 mol %, based on the total amount of the tetracarboxylic acid components.

With respect to the diamine component, an aliphatic diamine is essential. The aliphatic diamine preferably has 2 to 15 carbon atoms, more preferably 4 to 12 carbon atoms, further preferably 6 to 8 carbon atoms.

Examples of the aliphatic diamine include ethylenediamine, hexamethylenediamine, polyethylene glycol bis(3-aminopropyl) ether, polypropylene glycol bis(3-aminopropyl) ether, 1,3-bis(aminomethyl)cyclohexane, 1,4-bis(aminomethyl)cyclohexane, p-xylylenediamine, m-xylylenediamine, and siloxanediamines. These may be used singly or in combination of two or more thereof.

With respect to the aliphatic diamine, especially, at least one selected from the group consisting of aliphatic diamines, such as 1,3-bis(aminomethyl)cyclohexane [the above formula (b-2)], 1,4-bis(aminomethyl)cyclohexane [the above formula (b-1)], m-xylylenediamine [the above formula (b-3)], and p-xylylenediamine; and alicyclic diamines, such as isophoronediamine, norbornanediamine, bis(4-aminocyclohexyl)methane, and bis(4-aminocyclohexyl)isopropylidene is preferably contained, at least one selected from the group consisting of 1,3-bis(aminomethyl)cyclohexane, 1,4-bis(aminomethyl)cyclohexane, and m-xylylenediamine is more preferably contained, and at least one selected from the group consisting of 1,3-bis(aminomethyl)cyclohexane and 1,4-bis(aminomethyl)cyclohexane is further preferably contained.

The amount of the aliphatic diamine used other than the aliphatic diamines represented by the above formulae (b-1), (b-2), and (b-3) is preferably 10 mol % or less, more preferably 5 mol % or less, further preferably 1 mol % or less, still further preferably 0 mol %, based on the total amount of the diamine components.

From the viewpoint of the heat resistance and mechanical physical properties, the diamine component may contain an aromatic diamine as a diamine other than the above-mentioned aliphatic diamine having 4 to 15 carbon atoms.

Examples of the aromatic diamine include 2,2'-bis(trifluoromethyl)benzidine [the above formula (b-4)], 2,2'-dimethylbenzidine, 1,4-phenylenediamine, 1,3-phenylenediamine, 2,4-toluenediamine, 4,4'-diaminodiphenyl ether, 3,4'-diaminodiphenyl ether, 4,4'-diaminodiphenylmethane, 1,4-bis(4-aminophenoxy)benzene, 1,3-bis(4-aminophenoxy)benzene, 1,3-bis(3-aminophenoxy)benzene, α,α'-bis(4-aminophenyl)-1,4-diisopropylbenzene, α,α'-bis(3-aminophenyl)-1,4-diisopropylbenzene, 2,2-bis[4-(4-aminophenoxy)phenyl]propane, 4,4'-diaminodiphenyl sulfone, bis [4-(4-aminophenoxy)phenyl] sulfone, bis[4-(3-aminophenoxy)phenyl] sulfone, 2,6-diaminonaphthalene, and 1,5-diaminonaphthalene. These may be used singly or in combination of two or more thereof.

Of these, from the viewpoint of the low water absorption properties and transparency, 2,2'-bis(trifluoromethyl)benzidine is preferred.

The amount of the aromatic diamine used other than 2,2'-bis(trifluoromethyl)benzidine is preferably 20 mol % or less, more preferably 10 mol % or less, further preferably 1 mol % or less, still further preferably 0 mol %, based on the total amount of the diamine components.

In producing the polyimide resin of the present invention, with respect to the ratio of the amounts of the tetracarboxylic acid component and diamine component charged, the amount of the diamine component is preferably 0.9 to 1.1 mol relative to 1 mol of the tetracarboxylic acid component.

In producing the polyimide resin of the present invention, a terminal blocking agent may be used in addition to the tetracarboxylic acid component and diamine component. With respect to the terminal blocking agent, monoamines or dicarboxylic acids are preferred. The charged amount of the terminal blocking agent which is to be introduced is preferably 0.0001 to 0.1 mol, more preferably 0.001 to 0.06 mol, relative to 1 mol of the tetracarboxylic acid component. With respect to the monoamine terminal blocking agent, for example, methylamine, ethylamine, propylamine, butylamine, benzylamine, 4-methylbenzylamine, 4-ethylbenzylamine, 4-dodecylbenzylamine, 3-methylbenzylamine, 3-ethylbenzylamine, aniline, 3-methylaniline, 4-methylaniline, and the like are recommended. Of these, benzylamine and aniline can be preferably used. With respect to the dicarboxylic acid terminal blocking agent, preferred are dicarboxylic acids, part of which may be cyclized. For example, phthalic acid, phthalic anhydride, 4-chlorophthalic acid, tetrafluorophthalic acid, 2,3-benzophenonedicarboxylic acid, 3,4-benzophenonedicarboxylic acid, cyclohexane-1,2-dicarboxylic acid, cyclopentane-1,2-dicarboxylic acid, 4-cyclohexene-1,2-dicarboxylic acid, and the like are recommended. Of these, phthalic acid and phthalic anhydride can be preferably used.

With respect to the method for reacting the above-mentioned tetracarboxylic acid component and diamine component, there is no particular limitation, and a known method may be used.

As specific examples of reaction methods, there are mentioned (1) a method in which a tetracarboxylic acid component, a diamine component, and a reaction solvent are charged into a reactor and the resultant mixture is stirred at room temperature to 80° C. for 0.5 to 30 hours, followed by temperature elevation, to perform an imidation reaction, (2) a method in which a diamine component and a reaction solvent are charged into a reactor to dissolve the diamine, and then a tetracarboxylic acid component is charged and the resultant mixture is stirred appropriately at room temperature to 80° C. for 0.5 to 30 hours, followed by temperature elevation, to perform an imidation reaction, and (3) a method in which a tetracarboxylic acid component, a diamine component, and a reaction solvent are charged into a reactor and then, immediately the temperature is elevated to perform an imidation reaction.

With respect to the reaction solvent used in the production of the polyimide resin, any solvent may be used as long as it does not inhibit an imidation reaction and can dissolve therein the formed polyimide resin. Examples of the reaction solvent include an aprotic solvent, a phenolic solvent, an ether solvent, and a carbonate solvent.

Specific examples of the aprotic solvent include amide solvents, such as N,N-dimethylisobutylamide, N,N-dimethylformamide, N,N-dimethylacetamide, N-methyl-2-pyrrolidone, N-methylcaprolactam, 1,3-dimethylimidazolidinone, and tetramethylurea; lactone solvents, such as γ-butyrolactone and γ-valerolactone; phosphorus-containing amide solvents, such as hexamethylphosphoric amide and hexamethylphosphine triamide; sulfur-containing solvents, such as dimethyl sulfone, dimethyl sulfoxide, and sulfolane; ketone solvents, such as acetone, cyclohexanone, and methylcyclohexane; amine solvents, such as picoline and pyridine; and ester solvents, such as (2-methoxy-1-methylethyl) acetate.

Specific examples of the phenolic solvent include phenol, o-cresol, m-cresol, p-cresol, 2,3-xylenol, 2,4-xylenol, 2,5-xylenol, 2,6-xylenol, 3,4-xylenol, and 3,5-xylenol.

Specific examples of the ether solvent include 1,2-dimethoxyethane, bis(2-methoxyethyl) ether, 1,2-bis(2-methoxyethoxy)ethane, bis[2-(2-methoxyethoxy)ethyl] ether, tetrahydrofuran, and 1,4-dioxane.

Further, specific examples of the carbonate solvent include diethyl carbonate, methylethyl carbonate, ethylene carbonate, and propylene carbonate.

Of the above reaction solvents, amide solvents or lactone solvents are preferred. The reaction solvents may be used singly or two or more thereof may be mixed and used in combination.

In the imidation reaction, it is preferred that the reaction is conducted while removing water formed during the production of polyimide using a Dean-Stark apparatus or the like. By performing such an operation, it is possible to further increase the degree of polymerization and imidation ratio.

In the above-mentioned imidation reaction, a known imidation catalyst may be used. Examples of the imidation catalyst include a basic catalyst and an acid catalyst.

Examples of the basic catalyst include organic basic catalysts, such as pyridine, quinoline, isoquinoline, α-picoline, β-picoline, 2,4-lutidine, 2,6-lutidine, trimethylamine, triethylamine, tripropylamine, tributylamine, imidazole, N,N-dimethylaniline, and N,N-diethylaniline, and inorganic basic catalysts, such as potassium hydroxide, sodium hydroxide, potassium carbonate, sodium carbonate, potassium hydrogencarbonate, and sodium hydrogencarbonate.

Further, examples of the acid catalyst include crotonic acid, acrylic acid, trans-3-hexenoic acid, cinnamic acid, benzoic acid, methylbenzoic acid, oxybenzoic acid, terephthalic acid, benzenesulfonic acid, paratoluenesulfonic acid, and naphthalenesulfonic acid. The above-mentioned imidation catalysts may be used singly or in combination of two or more thereof.

Of the above catalysts, from the viewpoint of the handling properties, a basic catalyst is preferably used, an organic basic catalyst is more preferably used, and triethylamine is further preferably used.

When using the catalyst, from the viewpoint of the reaction rate and suppression of gelation or the like, the temperature for the imidation reaction is preferably 120 to 250° C., more preferably 160 to 190° C., further preferably 180 to 190° C. Further, the reaction time is preferably 0.5 to 10 hours after the start of distilling of the water formed.

When using no catalyst, the temperature for the imidation reaction is preferably 200 to 350° C.

[Polyimide Resin/Polyimide Resin Composition]

The polyimide resin of the present invention preferably has a number average molecular weight of 5,000 to 100,000 from the viewpoint of the mechanical strength of the polyimide film obtained therefrom. The number average molecular weight of the polyimide resin can be measured by gel permeation chromatography or the like.

The polyimide resin composition of the present invention contains the polyimide resin of the present invention and inorganic nanoparticles. Since the composition contains the inorganic nanoparticles, the mechanical physical properties (modulus) can be improved without impairing the features of the polyimide resin of the present invention, i.e., heat resistance, colorlessness and transparency, and low water absorption properties.

The inorganic nanoparticles are preferably, for example, metal oxide nanoparticles selected from the group consisting of silica, titanium oxide, aluminum oxide, zirconium oxide, barium titanate, chromium oxide, zinc oxide, magnesium oxide, cerium oxide, iron oxide, copper oxide, and tin oxide. From the viewpoint of improving the mechanical physical properties (modulus) without impairing the features of the polyimide resin of the present invention, i.e., heat resistance, colorlessness and transparency, and low water absorption properties, the inorganic nanoparticles are more preferably aluminum oxide.

One type of these inorganic nanoparticles may be singly used, or two or more types of these inorganic nanoparticles may be used in combination.

The inorganic nanoparticles may be, if necessary, subjected to surface treatment for the purpose of enhancing the dispersibility of the nanoparticles in the polyimide resin solution to improve the transparency of the polyimide film. Especially, the inorganic nanoparticles are preferably subjected to surface treatment using a surface treatment agent, such as a silane coupling agent.

With respect to the silane coupling agent, a known silane coupling agent may be used, but, from the viewpoint of the affinity with the polyimide resin, an amino group-containing silane coupling agent is preferred. Examples of the amino group-containing silane coupling agent include 3-(2-aminoethylamino)propyldimethoxymethylsilane, 3-(2-aminoethylamino)propyltrimethoxysilane, 3-(2-aminoethylamino) propyltriethoxysilane, 3-(3-aminopropylamino)propyltriethoxysilane, 3-(3-aminopropylamino)propyltrimethoxysilane, 3-aminopropyldiethoxymethylsilane, 3-aminopropyltriethoxysilane, and 3-aminopropyltrimethoxysilane. These may be used singly or in combination of two or more thereof.

With respect to the surface treatment method for the inorganic nanoparticles using a silane coupling agent, there is no particular limitation, and a known method may be used. For example, a method may be employed in which a dispersion having the inorganic nanoparticles dispersed in an organic solvent or the like is prepared, the above-mentioned silane coupling agent is added to the dispersion, and the resultant dispersion is stirred at a temperature of room temperature to about 80° C. for several hours. In this instance, a small amount of water may be added to accelerate the treatment reaction.

The inorganic nanoparticles preferably have an average particle diameter in the range of from 1 to 500 nm, more preferably from 5 to 300 nm, further preferably from 5 to 200 nm, still further preferably from 5 to 100 nm, still further preferably from 8 to 70 nm. When the average particle diameter of the inorganic nanoparticles is 1 nm or more, preparation of the inorganic nanoparticles is easy, and, when the average particle diameter of the inorganic nanoparticles is 500 nm or less, the transparency becomes excellent. The average particle diameter is an average particle diameter of the primary particles.

With respect to the shape of the inorganic nanoparticles, there is no particular limitation, and examples of the shape include spherical, plate-like, flake-like, cylindrical, and fibrous shapes. Of these, from the viewpoint of the transparency and dispersibility, a spherical shape is preferred.

When the inorganic nanoparticles are in an elliptic, plate-like, flake-like, cylindrical, or fibrous shape, the aspect ratio of the inorganic nanoparticle is preferably 2 to 700, more preferably 2 to 500.

The average particle diameter and aspect ratio of the inorganic nanoparticles are determined by observing the inorganic nanoparticles using, for example, a scanning electron microscope (SEM) or a transmission electron microscope (TEM), and calculating an average of 3 or more measured values.

With respect to the method for producing the polyimide resin composition of the present invention, there is no particular limitation, and a known method may be used. From the viewpoint of facilitating the preparation of the inorganic nanoparticles and easy incorporation and the dispersibility of the inorganic nanoparticles into a solution containing the polyimide resin, it is preferred that, for example, a dispersion of the inorganic nanoparticles is prepared and then the dispersion is incorporated into a solution containing the polyimide resin.

With respect to the dispersion medium for the dispersion of the inorganic nanoparticles, there is no particular limitation, and any of water and an organic solvent may be used. Examples of the organic solvent include alcohol solvents, such as methanol, propanol, butanol, ethylene glycol, propylene glycol, butanediol, pentanediol, hexylene glycol, diethylene glycol, dipropylene glycol, and ethylene glycol monopropyl ether; ketone solvents, such as methyl ethyl ketone and methyl isobutyl ketone; aromatic hydrocarbon solvents, such as toluene and xylene; amide solvents, such as N,N-dimethylformamide, N,N-dimethylacetamide, and N-methylpyrrolidone; ester solvents, such as ethyl acetate, butyl acetate, and γ-butyrolactone; and ether solvents, such as tetrahydrofuran and 1,4-dioxane. Of these, alcohol solvents or ketone solvents are preferred. These organic solvents may be used singly or two or more thereof may be mixed and used.

The amount of the inorganic nanoparticles contained in the polyimide resin composition is preferably 10 to 60 parts by mass, more preferably 15 to 50 parts by mass, further preferably 20 to 45 parts by mass, relative to 100 parts by mass of the polyimide resin. When the amount of the inorganic nanoparticles contained is 10 parts by mass or more, excellent mechanical physical properties (modulus) can be achieved, and, when the amount is 60 parts by mass or less, excellent dispersibility of the inorganic nanoparticles and excellent transparency of the polyimide film obtained from the resultant composition can be achieved.

The polyimide resin and polyimide resin composition of the present invention may have further mixed thereinto various additives as long as the effects of the present invention are not impaired. Examples of additives include an antioxidant, a light stabilizer, a surfactant, a flame retardant, a plasticizer, and polymer compounds other than the above-mentioned polyimide resin.

Examples of the polymer compound include polyimide other than the polyimide resin of the present invention, polycarbonate, polystyrene, polyamide, polyamide-imide, polyester, such as polyethylene terephthalate, polyether sulfone, polycarboxylic acid, polyacetal, polyphenylene ether, polysulfone, polybutylene, polypropylene, polyacrylamide, and polyvinyl chloride.

The solid concentration of the solution containing the polyimide resin of the present invention or the polyimide resin composition of the present invention may be appropriately selected according to the workability in forming the polyimide film described later or the like, and the solid concentration or viscosity of the solution containing the polyimide resin of the present invention or the polyimide resin composition of the present invention may be controlled by volatilizing the reaction solvent used when producing the polyimide resin of the present invention to concentrate the solution, or by adding an organic solvent to the solution. With respect to the organic solvent, there is no particular limitation as long as it can dissolve therein the polyimide resin.

The solid concentration of the solution containing the polyimide resin of the present invention or the polyimide resin composition of the present invention is preferably 5 to 60% by mass, more preferably 10 to 45% by mass. The viscosity of the polyimide resin of the present invention or the polyimide resin composition of the present invention is preferably 1 to 200 Pa·s, more preferably 5 to 150 Pa·s.

[Polyimide Film]

The polyimide film of the present invention contains the polyimide resin of the present invention or the polyimide resin composition of the present invention, and has not only excellent transparency and excellent heat resistance but also low water absorption ratio. The polyimide film of the present invention preferably contains a cured product of the polyimide resin of the present invention or the polyimide resin composition of the present invention.

With respect to the method for forming the polyimide film of the present invention, there is no particular limitation, and a known method may be used. For example, there may be mentioned a method in which a solution containing the polyimide resin of the present invention or the polyimide resin composition of the present invention, or a solution containing a solution containing the polyimide resin of the present invention or the polyimide resin composition of the present invention and the above-mentioned various additives is applied onto a smooth substrate, such as a glass plate, a metal plate, or a plastic, or is shaped into a film form, and then a solvent component, such as the organic solvent contained in the solution, is removed.

The solution containing the polyimide resin may be a polyimide resin solution obtained just after a polymerization method, or may be the above polyimide resin solution which has mixed thereinto at least one selected from the compounds mentioned above as examples of the solvents dissolving the polyimide resin. By controlling the solid concentration or viscosity of the solution containing the polyimide resin or polyimide resin composition as mentioned above, it is possible to easily control the thickness of the polyimide film of the present invention.

A release agent may be applied to the surface of the substrate if necessary. After the solution containing the polyimide resin or the polyimide resin composition is applied to the substrate, a method of heating the solution to cause the solvent component to volatilize may be preferably the following method. Specifically, preferred is a method in which the solvent is allowed to volatilize at a temperature of 120° C. or lower to form a self-supporting film, and then the self-supporting film is removed from the substrate, and the self-supporting film is fixed at the end portions and dried at a temperature of the boiling point of the solvent component used to 350° C. or lower to produce a polyimide film. The film is preferably dried in a nitrogen gas atmosphere. The pressure in the atmosphere for drying may be any of a reduced pressure, atmospheric pressure, and a positive pressure.

The thickness of the polyimide film of the present invention may be appropriately selected according to the use of the film or the like, but is preferably in the range of from 1 to 250 μm, more preferably from 5 to 100 μm, further preferably from 10 to 80 μm. When the polyimide film has a thickness of 1 to 250 μm, the polyimide film may be practically used as a self-supporting film.

In the present invention, the polyimide film preferably having a total light transmittance of 85% or more, more preferably 88% or more, further preferably 89% or more, still further preferably 90% or more in terms of a thickness of 80 μm, can be obtained.

In the present invention, the polyimide film preferably having a yellow index (YI value) of 3.5 or less, more preferably 3.0 or less, further preferably 2.9 or less, still further preferably 2.6 or less can be obtained.

In the present invention, the polyimide film preferably having a water absorption ratio of 1.4% or less, more preferably 1.2% or less, further preferably 1.0% or less, still further preferably 0.95% or less can be obtained.

In the present invention, the polyimide film preferably having a glass transition temperature of 200° C. or higher, more preferably 220° C. or higher, further preferably 235° C. or higher, still further preferably 250° C. or higher can be obtained.

The total light transmittance, YI value, water absorption ratio, and glass transition temperature of the polyimide film can be measured specifically by the methods described in the following working examples.

The polyimide film containing the polyimide resin of the present invention or the polyimide resin composition of the present invention is advantageously used as a film for various members, such as a color filter, a flexible display, a semiconductor part, and an optical member.

EXAMPLES

Hereinbelow, the present invention will be described in detail with reference to the following Examples, which should not be construed as limiting the scope of the present invention.

In the present working examples, a solid concentration and a thickness of a film were determined as follows.
(1) Solid Concentration:
The measurement of a solid concentration of a polyimide resin was conducted by heating a sample in a small-size electric furnace MMF-1, manufactured by AS ONE Corporation, at 300° C. for 30 minutes and calculating a solid concentration from a difference between the weights of the sample before and after the heating.
(2) Thickness of a Film:
The measurement of a thickness of a film was conducted using a micrometer, manufactured by Mitutoyo Corporation.
Physical properties of the polyimide films obtained in the following Examples and Comparative Examples were measured by the methods described below.
(1) Light Transmittance at Wavelengths of 400 nm and 450 nm
Using an ultraviolet-visible-near infrared spectrophotometer "UV-3100PC", manufactured by Shimadzu Corporation, the measurement of a light transmittance was conducted.

(2) Tensile Modulus and Tensile Strength
In accordance with ASTM-882-88, the measurement was conducted using a tensile tester "Strograph VC-1", manufactured by Toyo Seiki Seisaku-Sho, Ltd.
(3) Total Light Transmittance and YI Value
In accordance with JIS K7361-1, the measurement was conducted using a color/turbidity simultaneously measuring instrument "COH 400", manufactured by Nippon Denshoku Industries Co., Ltd.
(4) Glass Transition Temperature
Using a differential scanning calorimeter (DSC 6200), manufactured by SII Nano Technology Inc., the DSC measurement was conducted under conditions at a temperature increase rate of 10° C./minute, thereby determining a glass transition temperature (Tg).
(5) Water Absorption Ratio
A water absorption ratio was determined in accordance with JIS K7209.
A 50 mm×50 mm polyimide film was dried at 50° C. for 24 hours, and then cooled to room temperature in a desiccator, and a weight (W0) of the resultant film was measured in an environment at 23° C. and at a humidity of 60%. Then, the film was immersed in distilled water at 23° C. for 24 hours, and the moisture on the surface of the film was removed and then, after 1 minute, a weight (W1) of the resultant film was measured. A water absorption ratio was calculated based on the following formula.

Water absorption ratio (%)=[($W1-W0$)/$W0$]×100

(6) Deformation Recovery
As shown in FIG. 1(a), a polyimide film 1 cut into a size of width: 10 mm×length: 100 mm was fixed at R=3 mm using a fixture, and allowed to stand for 240 hours under conditions at 60° C. and at 90% RH. Then, the fixture was removed at 23° C. and at 50% RH, and the film was allowed to stand for 2 hours, and then an angle θ shown in FIG. 1(b) was measured to evaluate recovery of the film. The smaller the angle measured, the more excellent the deformation recovery, and a smaller value of the angle is advantageous.
(7) Organic Solvent Resistance
N,N-Dimethylacetamide (DMAc) and a polyimide film were placed at 1 mg/mL in a 50 mL Erlenmeyer flask, and stirred by means of a magnetic stirrer for 24 hours, and an organic solvent resistance was evaluated. The rating "A" indicates that the polyimide film was not dissolved, the rating "B" indicates that the polyimide film was not dissolved but swelled, and the rating "C" indicates that the polyimide film was dissolved.

Example 1

Into a 300 mL five-neck round bottom flask equipped with a stainless steel agitating blade in a half-moon shape, a nitrogen gas introducing pipe, a Dean-Stark apparatus having a condenser attached, a thermometer, and a glass end cap, 8.016 g (0.056 mol) of 1,4-bis(aminomethyl)cyclohexane (manufactured by Mitsubishi Gas Chemical Company, Inc.; hereinafter, referred to as "1,4-BAC:trans ratio 85%") and 4.512 g (0.014 mol) of 2,2'-bis(trifluoromethyl)benzidine (manufactured by Wakayama Seika Kogyo Co., Ltd.) as a diamine component, 49.72 g of γ-butyrolactone (manufactured by Mitsubishi Chemical Corporation) as an organic solvent, and 0.356 g of triethylamine (manufactured by Kanto Chemical Co., Inc.) as an imidation catalyst were charged, and the resultant mixture was stirred at the number of revolutions of 200 rpm in a nitrogen gas atmosphere at a temperature inside the system of 70° C. to obtain a solution. 31.295 g (0.070 mol) of 4,4'-(hexafluoroisopropylidene)

diphthalic anhydride (manufactured by Daikin Industries, Ltd.) as a tetracarboxylic acid component and 12.43 g of γ-butyrolactone (manufactured by Mitsubishi Chemical Corporation) as an organic solvent were added simultaneously to the obtained solution, and then the resultant mixture was heated using a mantle heater and the temperature inside the reaction system was increased to 190° C. over about 20 minutes. While trapping the component distilled off and controlling the number of revolutions according to an increase of the viscosity, the temperature inside the reaction system was maintained at 190° C. under reflux for 2 hours to obtain a polyimide solution. Then, the temperature inside the reaction system was lowered to 120° C. and then 103.59 g of N,N-dimethylacetamide (manufactured by Mitsubishi Gas Chemical Company, Inc.) was added to the solution, and the resultant mixture was stirred for about 3 hours so as to make the mixture uniform, thereby obtaining a polyimide resin solution (A) having a solid concentration of 20% by mass.

Subsequently, the polyimide resin solution (A) was applied onto a glass substrate, and maintained at 60° C. for 30 minutes and at 100° C. for one hour to cause the solvent to volatilize, thereby obtaining a colorless, transparent primary-dried film having self-supporting properties. Further, the resultant film was fixed to a stainless steel frame and dried in a nitrogen gas atmosphere at 280° C. for 2 hours to remove the solvent, thereby obtaining a film having a thickness of 56 μm. An FT-IR analysis made with respect to the obtained film has confirmed disappearance of the raw material peaks and appearance of a peak deriving from an imide skeleton. This polyimide film had a tensile modulus of 2.6 GPa, a tensile strength of 127 MPa, a total light transmittance of 91.6%, a transmittance at 400 nm of 87.0%, a transmittance at 450 nm of 90.0%, a YI value of 2.6, a Tg of 227° C., a water absorption ratio of 0.8%, and a deformation recovery of 20°, and was insoluble in DMAc (1 mg/mL).

Example 2

Into a 300 mL five-neck round bottom flask equipped with a stainless steel agitating blade in a half-moon shape, a nitrogen gas introducing pipe, a Dean-Stark apparatus having a condenser attached, a thermometer, and a glass end cap, 5.010 g (0.035 mol) of 1,4-bis(aminomethyl)cyclohexane (manufactured by Mitsubishi Gas Chemical Company, Inc.; trans ratio: 85%) and 11.280 g (0.035 mol) of 2,2'-bis(trifluoromethyl)benzidine (manufactured by Wakayama Seika Kogyo Co., Ltd.) as a diamine component, 54.22 g of γ-butyrolactone (manufactured by Mitsubishi Chemical Corporation) as an organic solvent, and 0.356 g of triethylamine (manufactured by Kanto Chemical Co., Inc.) as an imidation catalyst were charged, and the resultant mixture was stirred at the number of revolutions of 200 rpm in a nitrogen gas atmosphere at a temperature inside the system of 70° C. to obtain a solution. 31.295 g (0.070 mol) of 4,4'-(hexafluoroisopropylidene)diphthalic anhydride (manufactured by Daikin Industries, Ltd.) as a tetracarboxylic acid component and 13.55 g of γ-butyrolactone (manufactured by Mitsubishi Chemical Corporation) as an organic solvent were added simultaneously to the obtained solution, and then the resultant mixture was heated using a mantle heater and the temperature inside the reaction system was increased to 190° C. over about 20 minutes. While trapping the component distilled off and controlling the number of revolutions according to an increase of the viscosity, the temperature inside the reaction system was maintained at 190° C. under reflux for 2 hours to obtain a polyimide solution. Then, the temperature inside the reaction system was lowered to 120° C. and then 112.95 g of N,N-dimethylacetamide (manufactured by Mitsubishi Gas Chemical Company, Inc.) was added to the solution, and the resultant mixture was stirred for about 3 hours so as to make the mixture uniform, thereby obtaining a polyimide resin solution (B) having a solid concentration of 20% by mass.

Subsequently, the polyimide resin solution (B) was applied onto a glass substrate, and maintained at 60° C. for 30 minutes and at 100° C. for one hour to cause the solvent to volatilize, thereby obtaining a colorless, transparent primary-dried film having self-supporting properties. Further, the resultant film was fixed to a stainless steel frame and dried in a nitrogen gas atmosphere at 280° C. for 2 hours to remove the solvent, thereby obtaining a film having a thickness of 58 μm. An FT-IR analysis made with respect to the obtained film has confirmed disappearance of the raw material peaks and appearance of a peak deriving from an imide skeleton. This polyimide film had a tensile modulus of 2.4 GPa, a tensile strength of 118 MPa, a total light transmittance of 91.0%, a transmittance at 400 nm of 78.5%, a transmittance at 450 nm of 89.4%, a YI value of 2.3, a Tg of 265° C., a water absorption ratio of 0.6%, and a deformation recovery of 65°, and was soluble in DMAc (1 mg/mL).

Example 3

Into a 300 mL five-neck round bottom flask equipped with a stainless steel agitating blade in a half-moon shape, a nitrogen gas introducing pipe, a Dean-Stark apparatus having a condenser attached, a thermometer, and a glass end cap, 1.725 g (0.012 mol) of 1,4-bis(aminomethyl)cyclohexane (manufactured by Mitsubishi Gas Chemical Company, Inc.; trans ratio: 85%) and 15.539 g (0.049 mol) of 2,2'-bis(trifluoromethyl)benzidine (manufactured by Wakayama Seika Kogyo Co., Ltd.) as a diamine component, 50.55 g of γ-butyrolactone (manufactured by Mitsubishi Chemical Corporation) as an organic solvent, and 0.307 g of triethylamine (manufactured by Kanto Chemical Co., Inc.) as an imidation catalyst were charged, and the resultant mixture was stirred at the number of revolutions of 200 rpm in a nitrogen gas atmosphere at a temperature inside the system of 70° C. to obtain a solution. 29.945 g (0.061 mol) of 4,4'-(hexafluoroisopropylidene)diphthalic anhydride (manufactured by Daikin Industries, Ltd.) as a tetracarboxylic acid component and 12.64 g of γ-butyrolactone (manufactured by Mitsubishi Chemical Corporation) as an organic solvent were added simultaneously to the obtained solution, and then the resultant mixture was heated using a mantle heater and the temperature inside the reaction system was increased to 190° C. over about 20 minutes. While trapping the component distilled off and controlling the number of revolutions according to an increase of the viscosity, the temperature inside the reaction system was maintained at 190° C. under reflux for 2 hours to obtain a polyimide solution. Then, the temperature inside the reaction system was lowered to 120° C. and then 105.31 g of N,N-dimethylacetamide (manufactured by Mitsubishi Gas Chemical Company, Inc.) was added to the solution, and the resultant mixture was stirred for about 3 hours so as to make the mixture uniform, thereby obtaining a polyimide resin solution (C) having a solid concentration of 20% by mass.

Subsequently, the polyimide resin solution (C) was applied onto a glass substrate, and maintained at 60° C. for 30 minutes and at 100° C. for one hour to cause the solvent to volatilize, thereby obtaining a colorless, transparent primary-dried film having self-supporting properties. Further, the resultant film was fixed to a stainless steel frame and dried in a nitrogen gas atmosphere at 280° C. for 2 hours to remove the solvent, thereby obtaining a film having a thickness of 55 μm. An FT-IR analysis made with respect to the obtained film has confirmed disappearance of the raw material peaks and appearance of a peak deriving from an imide skeleton. This polyimide film had a tensile modulus of 2.5 GPa, a tensile strength of 111 MPa, a total light transmittance of 90.8%, a transmittance at 400 nm of 77.7%, a transmittance at 450 nm of 89.4%, a YI value of 2.4, a Tg of 294° C., a water absorption ratio of 0.4%, and a deformation recovery of 55°, and was soluble in DMAc (1 mg/mL).

Example 4

Into a 300 mL five-neck round bottom flask equipped with a stainless steel agitating blade in a half-moon shape, a nitrogen gas introducing pipe, a Dean-Stark apparatus having a condenser attached, a thermometer, and a glass end cap, 4.797 g (0.035 mol) of metaxylylenediamine (manufactured by Mitsubishi Gas Chemical Company, Inc.) and 11.280 g (0.035 mol) of 2,2'-bis(trifluoromethyl)benzidine (manufactured by Wakayama Seika Kogyo Co., Ltd.) as a diamine component, 53.957 g of γ-butyrolactone (manufactured by Mitsubishi Chemical Corporation) as an organic solvent, and 0.356 g of triethylamine (manufactured by Kanto Chemical Co., Inc.) as an imidation catalyst were charged, and the resultant mixture was stirred at the number of revolutions of 200 rpm in a nitrogen gas atmosphere at a temperature inside the system of 70° C. to obtain a solution. 31.357 g (0.070 mol) of 4,4'-(hexafluoroisopropylidene)diphthalic anhydride (manufactured by Daikin Industries, Ltd.) as a tetracarboxylic acid component and 13.489 g of γ-butyrolactone (manufactured by Mitsubishi Chemical Corporation) as an organic solvent were added simultaneously to the obtained solution, and then the resultant mixture was heated using a mantle heater and the temperature inside the reaction system was increased to 190° C. over about 20 minutes. While trapping the component distilled off and controlling the number of revolutions according to an increase of the viscosity, the temperature inside the reaction system was maintained at 190° C. under reflux for 2 hours to obtain a polyimide solution. Then, the temperature inside the reaction system was lowered to 120° C. and then 113.618 g of N,N-dimethylacetamide (manufactured by Mitsubishi Gas Chemical Company, Inc.) was added to the solution, and the resultant mixture was stirred for about 3 hours so as to make the mixture uniform, thereby obtaining a polyimide resin solution (D) having a solid concentration of 20% by mass.

Subsequently, the polyimide resin solution (D) was applied onto a glass substrate, and maintained at 60° C. for 30 minutes and at 100° C. for one hour to cause the solvent to volatilize, thereby obtaining a colorless, transparent primary-dried film having self-supporting properties. Further, the resultant film was fixed to a stainless steel frame and dried in a nitrogen gas atmosphere at 280° C. for 2 hours to remove the solvent, thereby obtaining a film having a thickness of 30 μm. An FT-IR analysis made with respect to the obtained film has confirmed disappearance of the raw material peaks and appearance of a peak deriving from an imide skeleton. This polyimide film had a tensile modulus of 3.1 GPa, a tensile strength of 116 MPa, a total light transmittance of 91.4%, a transmittance at 400 nm of 79.6%, a transmittance at 450 nm of 89.7%, a YI value of 1.8, a Tg of 248° C., a water absorption ratio of 0.5%, and a deformation recovery of 40°, and was soluble in DMAc (1 mg/mL).

Comparative Example 1

Into a 300 mL five-neck round bottom flask equipped with a stainless steel agitating blade in a half-moon shape, a nitrogen gas introducing pipe, a Dean-Stark apparatus having a condenser attached, a thermometer, and a glass end cap, 21.595 g (0.042 mol) of 2,2-bis[4-(4-aminophenoxy)phenyl]hexafluoropropane (manufactured by Wakayama Seika Kogyo Co., Ltd.) as a diamine component, 48.19 g of γ-butyrolactone (manufactured by Mitsubishi Chemical Corporation) as an organic solvent, and 0.211 g of triethylamine (manufactured by Kanto Chemical Co., Inc.) as an imidation catalyst were charged, and the resultant mixture was stirred at the number of revolutions of 200 rpm in a nitrogen gas atmosphere at a temperature inside the system of 70° C. to obtain a solution. 18.503 g (0.042 mol) of 4,4'-(hexafluoroisopropylidene)diphthalic anhydride (manufactured by Daikin Industries, Ltd.) as a tetracarboxylic acid component and 12.05 g of γ-butyrolactone (manufactured by Mitsubishi Chemical Corporation) as an organic solvent were added simultaneously to the obtained solution, and then the resultant mixture was heated using a mantle heater and the temperature inside the reaction system was increased to 190° C. over about 20 minute. While trapping the component distilled off and controlling the number of revolutions according to an increase of the viscosity, the temperature inside the reaction system was maintained at 190° C. under reflux for 2 hours to obtain a polyimide solution. Then, the temperature inside the reaction system was lowered to 120° C. and then 97.40 g of N,N-dimethylacetamide (manufactured by Mitsubishi Gas Chemical Company, Inc.) was added to the solution, and the resultant mixture was stirred for about 3 hours so as to make the mixture uniform, thereby obtaining a polyimide resin solution (E) having a solid concentration of 20% by mass.

Subsequently, the polyimide resin solution (E) was applied onto a glass substrate, and maintained at 60° C. for 30 minutes and at 100° C. for one hour to cause the solvent to volatilize, thereby obtaining a transparent primary-dried film having self-supporting properties. Further, the resultant film was fixed to a stainless steel frame and dried in a nitrogen gas atmosphere at 280° C. for 2 hours to remove the solvent, thereby obtaining a film having a thickness of 62 μm. An FT-IR analysis made with respect to the obtained film has confirmed disappearance of the raw material peaks and appearance of a peak deriving from an imide skeleton. This polyimide film had a tensile modulus of 2.1 GPa, a tensile strength of 79 MPa, a total light transmittance of 90.5%, a transmittance at 400 nm of 15.6%, a transmittance at 450 nm of 83.4%, a YI value of 10.4, a Tg of 262° C., a water absorption ratio of 0.4%, and a deformation recovery of 40°, and was soluble in DMAc (1 mg/mL).

Comparative Example 2

Into a 300 mL five-neck round bottom flask equipped with a stainless steel agitating blade in a half-moon shape, a nitrogen gas introducing pipe, a Dean-Stark apparatus having a condenser attached, a thermometer, and a glass end cap, 17.363 g (0.054 mol) of 2,2'-bis(trifluoromethyl)benzidine (manufactured by Wakayama Seika Kogyo Co., Ltd.) as a diamine component, 49.82 g of γ-butyrolactone (manufactured by Mitsubishi Chemical Corporation) as an organic solvent, and 0.274 g of triethylamine (manufactured by Kanto Chemical Co., Inc.) as an imidation catalyst were charged, and the resultant mixture was stirred at the number of revolutions of 200 rpm in a nitrogen gas atmosphere at a temperature inside the system of 70° C. to obtain a solution. 24.087 g (0.054 mol) of 4,4'-(hexafluoroisopropylidene) diphthalic anhydride (manufactured by Daikin Industries, Ltd.) as a tetracarboxylic acid component and 12.45 g of γ-butyrolactone (manufactured by Mitsubishi Chemical Corporation) as an organic solvent were added simultaneously to the obtained solution, and then the resultant mixture was heated using a mantle heater and the temperature inside the reaction system was increased to 190° C. over about 20 minutes. While trapping the component distilled off and controlling the number of revolutions according to an increase of the viscosity, the temperature inside the reaction system was maintained at 190° C. under reflux for 2 hours to obtain a polyimide solution. Then, the temperature inside the reaction system was lowered to 120° C. and then 95.97 g of N,N-dimethylacetamide (manufactured by Mitsubishi Gas Chemical Company, Inc.) was added to the solution, and the resultant mixture was stirred for about 3 hours so as to make the mixture uniform, thereby obtaining a polyimide resin solution (F) having a solid concentration of 20% by mass.

Subsequently, the polyimide resin solution (F) was applied onto a glass substrate, and maintained at 60° C. for 30 minutes and at 100° C. for one hour to cause the solvent to volatilize, thereby obtaining a colorless, transparent primary-dried film having self-supporting properties. Further, the resultant film was fixed to a stainless steel frame and dried in a nitrogen gas atmosphere at 280° C. for 2 hours to remove the solvent, thereby obtaining a film having a thickness of 59 μm. An FT-IR analysis made with respect to the obtained film has confirmed disappearance of the raw material peaks and appearance of a peak deriving from an imide skeleton. This polyimide film had a tensile modulus of 2.5 GPa, a tensile strength of 104 MPa, a total light transmittance of 90.6%, a transmittance at 400 nm of 80.3%, a transmittance at 450 nm of 88.9%, a II value of 3.9, a Tg of 328° C., a water absorption ratio of 1.3%, and a deformation recovery of 85°, and was soluble in DMAc (1 mg/mL).

Example 5

Into a 300 mL five-neck round bottom flask equipped with a stainless steel agitating blade in a half-moon shape, a nitrogen gas introducing pipe, a Dean-Stark apparatus having a condenser attached, a thermometer, and a glass end cap, 8.554 g (0.060 mol) of 1,3-bis(aminomethyl)cyclohexane (manufactured by Mitsubishi Gas Chemical Company, Inc.; hereinafter, referred to as "1,3-BAC:trans ratio 30%") and 4.814 g (0.015 mol) of 2,2'-bis(trifluoromethyl) benzidine (manufactured by Wakayama Seika Kogyo Co., Ltd.) as a diamine component, 50.34 g of γ-butyrolactone (manufactured by Mitsubishi Chemical Corporation) as an organic solvent, and 0.380 g of triethylamine (manufactured by Kanto Chemical Co., Inc.) as an imidation catalyst were charged, and the resultant mixture was stirred at the number of revolutions of 200 rpm in a nitrogen gas atmosphere at a temperature inside the system of 70° C. to obtain a solution. 26.714 g (0.060 mol) of 4,4'-(hexafluoroisopropylidene) diphthalic anhydride (manufactured by Daikin Industries, Ltd.) and 4.423 g (0.015 mol) of 3,3',4,4'-biphenyltetracarboxylic dianhydride (manufactured by Mitsubishi Chemical Corporation) as a tetracarboxylic acid component, and 12.58 g of γ-butyrolactone (manufactured by Mitsubishi Chemical Corporation) as an organic solvent were added simultaneously to the obtained solution, and then the resultant mixture was heated using a mantle heater and the temperature inside the reaction system was increased to 190° C. over about 20 minutes. While trapping the component distilled off and controlling the number of revolutions according to an increase of the viscosity, the temperature inside the reaction system was maintained at 190° C. under reflux for 2 hours to obtain a polyimide solution. Then, the temperature inside the reaction system was lowered to 120° C. and then 104.87 g of N,N-dimethylacetamide (manufactured by Mitsubishi Gas Chemical Company, Inc.) was added to the solution, and the resultant mixture was stirred for about 3 hours so as to make the mixture uniform, thereby obtaining a polyimide resin solution (G) having a solid concentration of 20% by mass.

Subsequently, the polyimide resin solution (G) was applied onto a glass substrate, and maintained at 60° C. for 30 minutes and at 100° C. for one hour to cause the solvent to volatilize, thereby obtaining a colorless, transparent primary-dried film having self-supporting properties. Further, the resultant film was fixed to a stainless steel frame and dried in a nitrogen gas atmosphere at 280° C. for 2 hours to remove the solvent, thereby obtaining a film having a thickness of 35 μm. An FT-IR analysis made with respect to the obtained film has confirmed disappearance of the raw material peaks and appearance of a peak deriving from an imide skeleton. This polyimide film had a tensile modulus of 2.5 GPa, a tensile strength of 106 MPa, a total light transmittance of 90.8%, a transmittance at 400 nm of 73.5%, a transmittance at 450 nm of 86.4%, a YI value of 3.0, a Tg of 236° C., a water absorption ratio of 0.9%, and a deformation recovery of 40°, and was insoluble (swelled) in DMAc (1 mg/mL).

Example 6

Into a 300 mL five-neck round bottom flask equipped with a stainless steel agitating blade in a half-moon shape, a nitrogen gas introducing pipe, a Dean-Stark apparatus having a condenser attached, a thermometer, and a glass end cap, 9.138 g (0.064 mol) of 1,3-bis(aminomethyl)cyclohexane (manufactured by Mitsubishi Gas Chemical Company, Inc.; trans ratio: 30%) and 5.143 g (0.016 mol) of 2,2'-bis(trifluoromethyl)benzidine (manufactured by Wakayama Seika Kogyo Co., Ltd.) as a diamine component, 49.42 g of γ-butyrolactone (manufactured by Mitsubishi Chemical Corporation) as an organic solvent, and 0.406 g of triethylamine (manufactured by Kanto Chemical Co., Inc.) as an imidation catalyst were charged, and the resultant mixture was stirred at the number of revolutions of 200 rpm in a nitrogen gas atmosphere at a temperature inside the system of 70° C. to obtain a solution. 17.837 g (0.040 mol) of 4,4'-(hexafluoroisopropylidene)diphthalic anhydride (manufactured by Daikin Industries, Ltd.) and 11.813 g (0.040 mol) of 3,3',4,4'-biphenyltetracarboxylic dianhydride (manufactured by Mitsubishi Chemical Corporation) as a tetracarboxylic acid component, and 12.35 g of γ-butyrolactone (manufactured by Mitsubishi Chemical Corporation) as an organic solvent were added simultaneously to the obtained solution, and then the resultant mixture was heated using a mantle heater and the temperature inside the reaction system was increased to 190° C. over about 20 minutes. While trapping the component distilled off and controlling the number of revolutions according to an increase of the viscosity, the temperature inside the reaction system was maintained at 190° C. under reflux for 2 hours to obtain a polyimide solution. Then, the temperature inside the reaction system was lowered to 120° C. and then 102.949 g of N,N-dimethylacetamide (manufactured by Mitsubishi Gas Chemical Company, Inc.) was added to the solution, and the resultant mixture was stirred for about 3 hours so as to make the mixture uniform, thereby obtaining a polyimide resin solution (H) having a solid concentration of 20% by mass.

Subsequently, the polyimide resin solution (H) was applied onto a glass substrate, and maintained at 60° C. for 30 minutes and at 100° C. for one hour to cause the solvent to volatilize, thereby obtaining a colorless, transparent primary-dried film having self-supporting properties. Further, the resultant film was fixed to a stainless steel frame and dried in a nitrogen gas atmosphere at 280° C. for 2 hours to remove the solvent, thereby obtaining a film having a thickness of 40 μm. An FT-IR analysis made with respect to the obtained film has confirmed disappearance of the raw material peaks and appearance of a peak deriving from an imide skeleton. This polyimide film had a tensile modulus of 2.7 GPa, a tensile strength of 119 MPa, a total light transmittance of 89.7%, a transmittance at 400 nm of 71.6%, a transmittance at 450 nm of 88.2%, a YI value of 2.9, a Tg of 239° C., a water absorption ratio of 1.0%, and a deformation recovery of 50°, and was insoluble in DMAc (1 mg/mL).

Example 7

Into a 300 mL five-neck round bottom flask equipped with a stainless steel agitating blade in a half-moon shape, a nitrogen gas introducing pipe, a Dean-Stark apparatus having a condenser attached, a thermometer, and a glass end cap, 13.056 g (0.092 mol) of 1,3-bis(aminomethyl)cyclohexane (manufactured by Mitsubishi Gas Chemical Company, Inc.; trans ratio: 30%) as a diamine component, 52.58 g of γ-butyrolactone (manufactured by Mitsubishi Chemical Corporation) as an organic solvent, and 0.464 g of triethylamine (manufactured by Kanto Chemical Co., Inc.) as an imidation catalyst were charged, and the resultant mixture was stirred at the number of revolutions of 200 rpm in a nitrogen gas atmosphere at a temperature inside the system of 70° C. to obtain a solution. 20.388 g (0.046 mol) of 4,4'-(hexafluoroisopropylidene)diphthalic anhydride (manufactured by Daikin Industries, Ltd.) and 13.502 g (0.046 mol) of 3,3',4,4'-biphenyltetracarboxylic dianhydride (manufactured by Mitsubishi Chemical Corporation) as a tetracarboxylic acid component, and 12.15 g of γ-butyrolactone (manufactured by Mitsubishi Chemical Corporation) as an organic solvent were added simultaneously to the obtained solution, and then the resultant mixture was heated using a mantle heater and the temperature inside the reaction system was increased to 190° C. over about 20 minutes. While trapping the component distilled off and controlling the number of revolutions according to an increase of the viscosity, the temperature inside the reaction system was maintained at 190° C. under reflux for 2 hours to obtain a polyimide solution. Then, the temperature inside the reaction system was lowered to 120° C. and then 109.55 g of N,N-dimethylacetamide (manufactured by Mitsubishi Gas Chemical Company, Inc.) was added to the solution, and the resultant mixture was stirred for about 3 hours so as to make the mixture uniform, thereby obtaining a polyimide resin solution (I) having a solid concentration of 20% by mass.

Subsequently, the polyimide resin solution (I) was applied onto a glass substrate, and maintained at 60° C. for 30 minutes and at 100° C. for one hour to cause the solvent to volatilize, thereby obtaining a colorless, transparent primary-dried film having self-supporting properties. Further, the resultant film was fixed to a stainless steel frame and dried in a nitrogen gas atmosphere at 280° C. for 2 hours to remove the solvent, thereby obtaining a film having a thickness of 58 μm. An FT-IR analysis made with respect to the obtained film has confirmed disappearance of the raw material peaks and appearance of a peak deriving from an imide skeleton. This polyimide film had a tensile modulus of 2.1 GPa, a tensile strength of 71 MPa, a total light transmittance of 89.8%, a transmittance at 400 nm of 85.4%, a transmittance at 450 nm of 88.1%, a YI value of 2.7, a Tg of 228° C., a water absorption ratio of 1.1%, and a deformation recovery of 40°, and was insoluble in DMAc (1 mg/mL).

Example 8

Into a 300 mL five-neck round bottom flask equipped with a stainless steel agitating blade in a half-moon shape, a nitrogen gas introducing pipe, a Dean-Stark apparatus having a condenser attached, a thermometer, and a glass end cap, 5.711 g (0.040 mol) of 1,3-bis(aminomethyl)cyclohexane (manufactured by Mitsubishi Gas Chemical Company, Inc.; 1,3-BAC:trans ratio 30%) and 12.858 g (0.040 mol) of 2,2'-bis(trifluoromethyl)benzidine (manufactured by Wakayama Seika Kogyo Co., Ltd.) as a diamine component, 54.539 g of γ-butyrolactone (manufactured by Mitsubishi Chemical Corporation) as an organic solvent, and 0.406 g of triethylamine (manufactured by Kanto Chemical Co., Inc.) as an imidation catalyst were charged, and the resultant mixture was stirred at the number of revolutions of 200 rpm in a nitrogen gas atmosphere at a temperature inside the system of 70° C. to obtain a solution. 17.873 g (0.040 mol) of 4,4'-(hexafluoroisopropylidene)diphthalic anhydride (manufactured by Daikin Industries, Ltd.) and 11.818 g (0.040 mol) of 3,3',4,4'-biphenyltetracarboxylic dianhydride (manufactured by Mitsubishi Chemical Corporation) as a tetracarboxylic acid component, and 13.634 g of γ-butyrolactone (manufactured by Mitsubishi Chemical Corporation) as an organic solvent were added simultaneously to the obtained solution, and then the resultant mixture was heated using a mantle heater and the temperature inside the reaction system was increased to 190° C. over about 20 minutes. While trapping the component distilled off and controlling the number of revolutions according to an increase of the viscosity, the temperature inside the reaction system was maintained at 190° C. under reflux for one hour to obtain a polyimide solution. Then, the temperature inside the reaction system was lowered to 120° C. and then 113.618 g of N,N-dimethylacetamide (manufactured by Mitsubishi Gas Chemical Company, Inc.) was added to the solution, and the resultant mixture was stirred for about 3 hours so as to make the mixture uniform, thereby obtaining a polyimide resin solution (J) having a solid concentration of 20% by mass.

Subsequently, the polyimide resin solution (J) was applied onto a glass substrate, and maintained at 60° C. for 30 minutes and at 100° C. for one hour to cause the solvent to volatilize, thereby obtaining a colorless, transparent primary-dried film having self-supporting properties. Further, the resultant film was fixed to a stainless steel frame and dried in a nitrogen gas atmosphere at 280° C. for 2 hours to remove the solvent, thereby obtaining a film having a thickness of 50 μm. An FT-IR analysis made with respect to the obtained film has confirmed disappearance of the raw material peaks and appearance of a peak deriving from an imide skeleton. This polyimide film had a tensile modulus of 3.0 GPa, a tensile strength of 125 MPa, a total light transmittance of 90.6%, a transmittance at 400 nm of 65.9%, a transmittance at 450 nm of 88.0%, a YI value of 2.6, a Tg of 257° C., a water absorption ratio of 0.9%, and a deformation recovery of 45°, and was insoluble in DMAc (1 mg/mL).

Example 9

Into a 300 mL five-neck round bottom flask equipped with a stainless steel agitating blade in a half-moon shape, a nitrogen gas introducing pipe, a Dean-Stark apparatus having a condenser attached, a thermometer, and a glass end cap, 5.711 g (0.040 mol) of 1,3-bis(aminomethyl)cyclohexane (manufactured by Mitsubishi Gas Chemical Company, Inc.; 1,3-BAC:trans ratio 30%) and 12.858 g (0.040 mol) of 2,2'-bis(trifluoromethyl)benzidine (manufactured by Wakayama Seika Kogyo Co., Ltd.) as a diamine component, 36.358 g of N,N-dimethylacetamide (manufactured by Mitsubishi Gas Chemical Company, Inc.) as an organic solvent, and 0.406 g of triethylamine (manufactured by Kanto Chemical Co., Inc.) as an imidation catalyst were charged, and the resultant mixture was stirred at the number of revolutions of 200 rpm in a nitrogen gas atmosphere at a temperature inside the system of 70° C. to obtain a solution. 17.873 g (0.040 mol) of 4,4'-(hexafluoroisopropylidene) diphthalic anhydride (manufactured by Daikin Industries, Ltd.) and 11.818 g (0.040 mol) of 3,3',4,4'-biphenyltetracarboxylic dianhydride (manufactured by Mitsubishi Chemical Corporation) as a tetracarboxylic acid component, and 9.089 g of γ-butyrolactone (manufactured by Mitsubishi Chemical Corporation) as an organic solvent were added simultaneously to the obtained solution, and then the resultant mixture was heated using a mantle heater and the temperature inside the reaction system was increased to 165° C. over about 20 minutes. While trapping the component distilled off and controlling the number of revolutions according to an increase of the viscosity, the temperature inside the reaction system was maintained at 165° C. under reflux for 5 hours to obtain a polyimide solution. Then, the temperature inside the reaction system was lowered to 120° C. and then 136.341 g of N,N-dimethylacetamide (manufactured by Mitsubishi Gas Chemical Company, Inc.) was added to the solution, and the resultant mixture was stirred for about 3 hours so as to make the mixture uniform, thereby obtaining a polyimide resin solution (K) having a solid concentration of 20% by mass.

Subsequently, the polyimide resin solution (K) was applied onto a glass substrate, and maintained at 60° C. for 30 minutes and at 100° C. for one hour to cause the solvent to volatilize, thereby obtaining a colorless, transparent primary-dried film having self-supporting properties. Further, the resultant film was fixed to a stainless steel frame and dried in a nitrogen gas atmosphere at 280° C. for 2 hours to remove the solvent, thereby obtaining a film having a thickness of 40 μm. An FT-IR analysis made with respect to the obtained film has confirmed disappearance of the raw material peaks and appearance of a peak deriving from an imide skeleton. This polyimide film had a tensile modulus of 3.2 GPa, a tensile strength of 120 MPa, a total light transmittance of 90.5%, a transmittance at 400 nm of 69.3%, a transmittance at 450 nm of 88.8%, a YI value of 2.2, a Tg of 257° C., a water absorption ratio of 0.9%, and a deformation recovery of 45°, and was soluble in DMAc (1 mg/mL).

Example 10

Into a 300 ml four-neck round bottom flask equipped with a stainless steel agitating blade in a half-moon shape, a nitrogen gas introducing pipe, a thermometer, and a glass end cap, 6.67 g of an alumina particles dispersion (ALMIBK30WT %-H06, manufactured by CIK NanoTek Co., Ltd. (solid concentration: 30% by mass)) and 50.00 g of a polyimide resin solution (K) having a solid concentration of 20% by mass, which had been obtained by the same method as in Example 9, were charged, and the resultant mixture was stirred at the number of revolutions of 200 rpm in a nitrogen gas atmosphere at room temperature to obtain a polyimide resin-alumina composite solution (L).

Subsequently, the polyimide resin-alumina composite solution (L) was applied onto a glass substrate, and maintained at 60° C. for 30 minutes and at 100° C. for one hour to cause the solvent to volatilize, thereby obtaining a colorless, transparent primary-dried film having self-supporting properties. Further, the resultant film was fixed to a stainless steel frame and dried in a nitrogen gas atmosphere at 280° C. for 2 hours to remove the solvent, thereby obtaining a film having a thickness of 50 μm. This polyimide film had a tensile modulus of 4.2 GPa, a tensile strength of 126 MPa, a total light transmittance of 90.0%, a transmittance at 400 nm of 60.5%, a transmittance at 450 nm of 88.0%, a YI value of 2.6, a Tg of 248° C., a water absorption ratio of 1.4%, and a deformation recovery of 50°, and was soluble in DMAc (1 mg/mL).

Example 11

Into a 300 ml four-neck round bottom flask equipped with a stainless steel agitating blade in a half-moon shape, a nitrogen gas introducing pipe, a thermometer, and a glass end cap, 13.33 g of an alumina particles dispersion (ALMIBK30WT %-H06, manufactured by CIK NanoTek Co., Ltd. (solid concentration: 30% by mass)) and 50.00 g of a polyimide resin solution (D) having a solid concentration of 20% by mass, which had been obtained by the same method as in Example 4, were charged, and the resultant mixture was stirred at the number of revolutions of 200 rpm in a nitrogen gas atmosphere at room temperature to obtain a polyimide resin-alumina composite solution (M).

Subsequently, the polyimide resin-alumina composite solution (M) was applied onto a glass substrate, and maintained at 60° C. for 30 minutes and at 100° C. for one hour to cause the solvent to volatilize, thereby obtaining a colorless, transparent primary-dried film having self-supporting properties. Further, the resultant film was fixed to a stainless steel frame and dried in a nitrogen gas atmosphere at 280° C. for 2 hours to remove the solvent, thereby obtaining a film having a thickness of 35 μm. This polyimide film had a tensile modulus of 4.3 GPa, a tensile strength of 111 MPa, a total light transmittance of 90.3%, a transmittance at 400 nm of 82.9%, a transmittance at 450 nm of 88.5%, a YI value of 2.1, a Tg of 248° C., a water absorption ratio of 0.8%, and a deformation recovery of 40°, and was soluble in DMAc (1 mg/mL).

Example 12

Into a 300 mL five-neck round bottom flask equipped with a stainless steel agitating blade in a half-moon shape, a nitrogen gas introducing pipe, a Dean-Stark apparatus having a condenser attached, a thermometer, and a glass end cap, 8.554 g (0.060 mol) of 1,4-bis(aminomethyl)cyclohexane (manufactured by Mitsubishi Gas Chemical Company, Inc.; trans ratio: 85%) and 4.814 g (0.015 mol) of 2,2'-bis(trifluoromethyl)benzidine (manufactured by Wakayama Seika Kogyo Co., Ltd.) as a diamine component, 50.34 g of γ-butyrolactone (manufactured by Mitsubishi Chemical Corporation) as an organic solvent, and 0.380 g of triethylamine (manufactured by Kanto Chemical Co., Inc.) as an imidation catalyst were charged, and the resultant mixture was stirred at the number of revolutions of 200 rpm in a nitrogen gas atmosphere at a temperature inside the system of 70° C. to obtain a solution. 26.714 g (0.060 mol) of 4,4'-(hexafluoroisopropylidene)diphthalic anhydride (manufactured by Daikin Industries, Ltd.) and 4.423 g (0.015 mol) of 3,3',4,4'-biphenyltetracarboxylic dianhydride (manufactured by Mitsubishi Chemical Corporation) as a tetracarboxylic acid component, and 12.58 g of γ-butyrolactone (manufactured by Mitsubishi Chemical Corporation) as an organic solvent were added simultaneously to the obtained solution, and then the resultant mixture was heated using a mantle heater and the temperature inside the reaction system was increased to 190° C. over about 20 minutes. While trapping the component distilled off and controlling the number of revolutions according to an increase of the viscosity, the temperature inside the reaction system was maintained at 190° C. under reflux for 2 hours to obtain a polyimide solution. Then, the temperature inside the reaction system was lowered to 120° C. and then 104.87 g of N,N-dimethylacetamide (manufactured by Mitsubishi Gas Chemical Company, Inc.) was added to the solution, and the resultant mixture was stirred for about 3 hours so as to make the mixture uniform, thereby obtaining a polyimide resin solution (N) having a solid concentration of 20% by mass.

Subsequently, the polyimide resin solution (N) was applied onto a glass substrate, and maintained at 60° C. for 30 minutes and at 100° C. for one hour to cause the solvent to volatilize, thereby obtaining a colorless, transparent primary-dried film having self-supporting properties. Further, the resultant film was fixed to a stainless steel frame and dried in a nitrogen gas atmosphere at 280° C. for 2 hours to remove the solvent, thereby obtaining a film having a thickness of 60 μm. An FT-IR analysis made with respect to the obtained film has confirmed disappearance of the raw material peaks and appearance of a peak deriving from an imide skeleton. This polyimide film had a tensile modulus of 2.3 GPa, a tensile strength of 109 MPa, a total light transmittance of 90.7%, a transmittance at 400 nm of 83.8%, a transmittance at 450 nm of 89.6%, a YI value of 2.5, a Tg of 260° C., a water absorption ratio of 1.0%, and a deformation recovery of 55°, and was insoluble in DMAc (1 mg/mL).

Example 13

Into a 300 mL five-neck round bottom flask equipped with a stainless steel agitating blade in a half-moon shape, a nitrogen gas introducing pipe, a Dean-Stark apparatus having a condenser attached, a thermometer, and a glass end cap, 5.711 g (0.040 mol) of 1,4-bis(aminomethyl)cyclohexane (manufactured by Mitsubishi Gas Chemical Company, Inc.; trans ratio: 85%) and 12.858 g (0.040 mol) of 2,2'-bis(trifluoromethyl)benzidine (manufactured by Wakayama Seika Kogyo Co., Ltd.) as a diamine component, 54.539 g of γ-butyrolactone (manufactured by Mitsubishi Chemical Corporation) as an organic solvent, and 0.406 g of triethylamine (manufactured by Kanto Chemical Co., Inc.) as an imidation catalyst were charged, and the resultant mixture was stirred at the number of revolutions of 200 rpm in a nitrogen gas atmosphere at a temperature inside the system of 70° C. to obtain a solution. 17.873 g (0.040 mol) of 4,4'-(hexafluoroisopropylidene)diphthalic anhydride (manufactured by Daikin Industries, Ltd.) and 11.818 g (0.040 mol) of 3,3',4,4'-biphenyltetracarboxylic dianhydride (manufactured by Mitsubishi Chemical Corporation) as a tetracarboxylic acid component, and 13.634 g of γ-butyrolactone (manufactured by Mitsubishi Chemical Corporation) as an organic solvent were added simultaneously to the obtained solution, and then the resultant mixture was heated using a mantle heater and the temperature inside the reaction system was increased to 190° C. over about 20 minutes. While trapping the component distilled off and controlling the number of revolutions according to an increase of the viscosity, the temperature inside the reaction system was maintained at 190° C. under reflux for one hour to obtain a polyimide solution. Then, the temperature inside the reaction system was lowered to 120° C. and then 113.618 g of N,N-dimethylacetamide (manufactured by Mitsubishi Gas Chemical Company, Inc.) was added to the solution, and the resultant mixture was stirred for about 3 hours so as to make the mixture uniform, thereby obtaining a polyimide resin solution (O) having a solid concentration of 20% by mass.

Subsequently, the polyimide resin solution (O) was applied onto a glass substrate, and maintained at 60° C. for 30 minutes and at 100° C. for one hour to cause the solvent to volatilize, thereby obtaining a colorless, transparent primary-dried film having self-supporting properties. Further, the resultant film was fixed to a stainless steel frame and dried in a nitrogen gas atmosphere at 280° C. for 2 hours to remove the solvent, thereby obtaining a film having a thickness of 30 μm. An FT-IR analysis made with respect to the obtained film has confirmed disappearance of the raw material peaks and appearance of a peak deriving from an imide skeleton. This polyimide film had a tensile modulus of 3.0 GPa, a tensile strength of 123 MPa, a total light transmittance of 90.3%, a transmittance at 400 nm of 68.5%, a transmittance at 450 nm of 88.2%, a YI value of 2.6, a Tg of 283° C., a water absorption ratio of 0.8%, and a deformation recovery of 40°, and was insoluble in DMAc (1 mg/mL).

Example 14

Into a 300 mL five-neck round bottom flask equipped with a stainless steel agitating blade in a half-moon shape, a nitrogen gas introducing pipe, a Dean-Stark apparatus having a condenser attached, a thermometer, and a glass end cap, 2.134 g (0.015 mol) of 1,3-bis(aminomethyl)cyclohexane (manufactured by Mitsubishi Gas Chemical Company, Inc.; 1,3-BAC:trans ratio 30%) and 19.214 g (0.060 mol) of 2,2'-bis(trifluoromethyl)benzidine (manufactured by Wakayama Seika Kogyo Co., Ltd.) as a diamine component, 61.29 g of γ-butyrolactone (manufactured by Mitsubishi Chemical Corporation) as an organic solvent, and 0.228 g of triethylamine (manufactured by Kanto Chemical Co., Inc.) as an imidation catalyst were charged, and the resultant mixture was stirred at the number of revolutions of 200 rpm in a nitrogen gas atmosphere at a temperature inside the system of 70° C. to obtain a solution. 26.714 g (0.060 mol) of 4,4'-(hexafluoroisopropylidene)diphthalic anhydride (manufactured by Daikin Industries, Ltd.) and 2.942 g (0.015 mol) of 1,2,3,4-cyclobutanetetracarboxylic dianhydride (manufactured by Wako Pure Chemical Industries, Ltd.) as a tetracarboxylic acid component, and 15.32 g of γ-butyrolactone (manufactured by Mitsubishi Chemical Corporation) as an organic solvent were added simultaneously to the obtained solution, and then the resultant mixture was heated using a mantle heater and the temperature inside the reaction system was increased to 190° C. over about 20 minutes. While trapping the component distilled off and controlling the number of revolutions according to an increase of the viscosity, the temperature inside the reaction system was maintained at 190° C. under reflux for 2 hours to obtain a polyimide solution. Then, the temperature inside the reaction system was lowered to 120° C. and then 116.87 g of γ-butyrolactone (manufactured by Mitsubishi Chemical Corporation) was added to the solution, and the resultant mixture was stirred for about 3 hours so as to make the mixture uniform, thereby obtaining a polyimide resin solution (P) having a solid concentration of 20% by mass.

Subsequently, the polyimide resin solution (P) was applied onto a glass substrate, and maintained at 60° C. for 30 minutes and at 100° C. for one hour to cause the solvent to volatilize, thereby obtaining a colorless, transparent primary-dried film having self-supporting properties. Further, the resultant film was fixed to a stainless steel frame and dried in a nitrogen gas atmosphere at 280° C. for 2 hours to remove the solvent, thereby obtaining a film having a thickness of 60 μm. An FT-IR analysis made with respect to the obtained film has confirmed disappearance of the raw material peaks and appearance of a peak deriving from an imide skeleton. This polyimide film had a tensile modulus of 2.5 GPa, a tensile strength of 122 MPa, a total light transmittance of 91.3%, a transmittance at 400 nm of 72.4%, a transmittance at 450 nm of 86.8%, a YI value of 2.2, a Tg of 295° C., a water absorption ratio of 0.8%, and a deformation recovery of 60°, and was soluble in DMAc.

Example 15

Into a 300 mL five-neck round bottom flask equipped with a stainless steel agitating blade in a half-moon shape, a nitrogen gas introducing pipe, a Dean-Stark apparatus having a condenser attached, a thermometer, and a glass end cap, 8.554 g (0.060 mol) of 1,3-bis(aminomethyl)cyclohexane (manufactured by Mitsubishi Gas Chemical Company, Inc.; 1,3-BAC:trans ratio 30%) and 4.814 g (0.015 mol) of 2,2'-bis(trifluoromethyl)benzidine (manufactured by Wakayama Seika Kogyo Co., Ltd.) as a diamine component, 42.08 g of γ-butyrolactone (manufactured by Mitsubishi Chemical Corporation) as an organic solvent, and 0.2228 g of triethylamine (manufactured by Kanto Chemical Co., Inc.) as an imidation catalyst were charged, and the resultant mixture was stirred at the number of revolutions of 200 rpm in a nitrogen gas atmosphere at a temperature inside the system of 70° C. to obtain a solution. 26.714 g (0.060 mol) of 4,4'-(hexafluoroisopropylidene)diphthalic anhydride (manufactured by Daikin Industries, Ltd.) and 2.942 g (0.015 mol) of 1,2,3,4-cyclobutanetetracarboxylic dianhydride (manufactured by Wako Pure Chemical Industries, Ltd.) as a tetracarboxylic acid component, and 10.52 g of γ-butyrolactone (manufactured by Mitsubishi Chemical Corporation) as an organic solvent were added simultaneously to the obtained solution, and then the resultant mixture was heated using a mantle heater and the temperature inside the reaction system was increased to 190° C. over about 20 minutes. While trapping the component distilled off and controlling the number of revolutions according to an increase of the viscosity, the temperature inside the reaction system was maintained at 190° C. under reflux for 2 hours to obtain a polyimide solution. Then, the temperature inside the reaction system was lowered to 120° C. and then 108.729 g of γ-butyrolactone (manufactured by Mitsubishi Chemical Corporation) was added to the solution, and the resultant mixture was stirred for about 3 hours so as to make the mixture uniform, thereby obtaining a polyimide resin solution (Q) having a solid concentration of 20% by mass.

Subsequently, the polyimide resin solution (Q) was applied onto a glass substrate, and maintained at 60° C. for 30 minutes and at 100° C. for one hour to cause the solvent to volatilize, thereby obtaining a colorless, transparent primary-dried film having self-supporting properties. Further, the resultant film was fixed to a stainless steel frame and dried in a nitrogen gas atmosphere at 280° C. for 2 hours to remove the solvent, thereby obtaining a film having a thickness of 63 μm. An FT-IR analysis made with respect to the obtained film has confirmed disappearance of the raw material peaks and appearance of a peak deriving from an imide skeleton. This polyimide film had a tensile modulus of 2.7 GPa, a tensile strength of 103 MPa, a total light transmittance of 91.3%, a transmittance at 400 nm of 84.1%, a transmittance at 450 nm of 89.4%, a YI value of 2.5, a Tg of 240° C., a water absorption ratio of 1.2%, and a deformation recovery of 40°, and was soluble in DMAc.

Comparative Example 3

Into a 300 mL five-neck round bottom flask equipped with a stainless steel agitating blade in a half-moon shape, a nitrogen gas introducing pipe, a Dean-Stark apparatus having a condenser attached, a thermometer, and a glass end cap, 21.136 g (0.066 mol) of 2,2'-bis(trifluoromethyl)benzidine (manufactured by Wakayama Seika Kogyo Co., Ltd.) as a diamine component, 49.06 g of γ-butyrolactone (manufactured by Mitsubishi Chemical Corporation) as an organic solvent, and 0.334 g of triethylamine (manufactured by Kanto Chemical Co., Inc.) as an imidation catalyst were charged, and the resultant mixture was stirred at the number of revolutions of 200 rpm in a nitrogen gas atmosphere at a temperature inside the system of 70° C. to obtain a solution. 14.660 g (0.033 mol) of 4,4'-(hexafluoroisopropylidene) diphthalic anhydride (manufactured by Daikin Industries, Ltd.) and 7.398 g (0.033 mol) of 1,2,4,5-cyclohexanetetracarboxylic dianhydride (manufactured by Mitsubishi Gas Chemical Company, Inc.) as a tetracarboxylic acid component, and 12.27 g of γ-butyrolactone (manufactured by Mitsubishi Chemical Corporation) as an organic solvent were added simultaneously to the obtained solution, and then the resultant mixture was heated using a mantle heater and the temperature inside the reaction system was increased to 190° C. over about 20 minutes. While trapping the component distilled off and controlling the number of revolutions according to an increase of the viscosity, the temperature inside the reaction system was maintained at 190° C. under reflux for 2 hours to obtain a polyimide solution. Then, the temperature inside the reaction system was lowered to 120° C. and then 102.22 g of N,N-dimethylacetamide (manufactured by Mitsubishi Gas Chemical Company, Inc.) was added to the solution, and the resultant mixture was stirred for about 3 hours so as to make the mixture uniform, thereby obtaining a polyimide resin solution (R) having a solid concentration of 20% by mass.

Subsequently, the polyimide resin solution (R) was applied onto a glass substrate, and maintained at 60° C. for 30 minutes and at 100° C. for one hour to cause the solvent to volatilize, thereby obtaining a colorless, transparent primary-dried film having self-supporting properties. Further, the resultant film was fixed to a stainless steel frame and dried in a nitrogen gas atmosphere at 280° C. for 2 hours to remove the solvent, thereby obtaining a film having a thickness of 59 μm. An FT-IR analysis made with respect to the obtained film has confirmed disappearance of the raw material peaks and appearance of a peak deriving from an imide skeleton. This polyimide film had a tensile modulus of 3.4 GPa, a tensile strength of 139 MPa, a total light transmittance of 91.0%, a transmittance at 400 nm of 80.7%, a transmittance at 450 nm of 89.2%, a YI value of 2.0, a Tg of 349° C., a water absorption ratio of 1.5%, and a deformation recovery of 80°, and was soluble in DMAc (1 mg/mL).

TABLE 1

|  |  |  | Example 1 | Example 2 | Example 3 | Example 4 | Example 11 | Comparative Example 1 | Comparative Example 2 |
|---|---|---|---|---|---|---|---|---|---|
| Polyimide | Tetracarboxylic acid component (mol %) | 6FDA | 100 | 100 | 100 | 100 | 100 | 100 | 100 |
|  |  | s-BPDA | — | — | — | — | — | — | — |
|  |  | CBDA | — | — | — | — | — | — | — |
|  |  | HPMDA | — | — | — | — | — | — | — |
|  | Diamine component (mol %) | 1,4-BAC *1 | 80 | 50 | 20 | — | — | — | — |
|  |  | 1,3-BAC *2 | — | — | — | — | — | — | — |
|  |  | MXDA | — | — | — | 50 | 50 | — | — |
|  |  | TFMB | 20 | 50 | 80 | 50 | 50 | — | 100 |
|  |  | HFBAPP | — | — | — | — | — | 100 | — |
|  | Amount of inorganic nanoparticles contained *3 |  | 0 | 0 | 0 | 0 | 40 | 0 | 0 |
| Evaluation | Tensile modulus (GPa) |  | 2.6 | 2.4 | 2.5 | 3.1 | 4.3 | 2.1 | 2.5 |
|  | Tensile strength (MPa) |  | 127 | 118 | 111 | 116 | 111 | 79 | 104 |
|  | Total light transmittance (%) |  | 91.6 | 91.0 | 90.8 | 91.4 | 90.3 | 90.5 | 90.6 |
|  | Transmittance at 400 nm (%) |  | 87.0 | 78.5 | 77.7 | 79.6 | 82.9 | 15.6 | 80.3 |
|  | Transmittance at 450 nm (%) |  | 90.0 | 89.4 | 89.4 | 89.7 | 88.5 | 83.4 | 88.9 |
|  | YI value |  | 2.6 | 2.3 | 2.4 | 1.8 | 2.1 | 10.4 | 3.9 |
|  | Tg (° C.) |  | 227 | 265 | 294 | 248 | 248 | 262 | 328 |
|  | Water absorption ratio (%) |  | 0.8 | 0.6 | 0.4 | 0.5 | 0.8 | 0.4 | 1.3 |
|  | Deformation recovery (°) |  | 20 | 65 | 55 | 40 | 40 | 40 | 85 |
|  | Organic solvent resistance |  | A | C | C | C | C | C | C |

*1: 1,4-BAC: trans ratio 85%
*2: 1,3-BAC: trans ratio 30%
*3: Amount (parts by mass) relative to 100 parts by mass of polyimide resin

TABLE 2

|  |  |  | Example 5 | Example 6 | Example 7 | Example 8 | Example 9 | Example 10 |
|---|---|---|---|---|---|---|---|---|
| Polyimide resin | Tetracarboxylic acid component (mol %) | 6FDA | 80 | 50 | 50 | 50 | 50 | 50 |
|  |  | s-BPDA | 20 | 50 | 50 | 50 | 50 | 50 |
|  |  | CBDA | — | — | — | — | — | — |
|  |  | HPMDA | — | — | — | — | — | — |
|  | Diamine component (mol %) | 1,4-BAC *1 | — | — | — | — | — | — |
|  |  | 1,3-BAC *2 | 80 | 80 | 100 | 50 | 50 | 50 |
|  |  | MXDA | — | — | — | — | — | — |
|  |  | TFMB | 20 | 20 | — | 50 | 50 | 50 |
|  |  | HFBAPP | — | — | — | — | — | — |
|  | Amount of inorganic nanoparticles contained *3 |  | 0 | 0 | 0 | 0 | 0 | 20 |
| Evaluation | Tensile modulus (GPa) |  | 2.5 | 2.7 | 2.1 | 3.0 | 3.2 | 4.2 |
|  | Tensile strength (MPa) |  | 106 | 119 | 71 | 125 | 120 | 126 |
|  | Total light transmittance (%) |  | 90.8 | 89.7 | 89.8 | 90.6 | 90.5 | 90.0 |
|  | Transmittance at 400 nm (%) |  | 73.5 | 71.6 | 85.4 | 65.9 | 69.3 | 60.5 |
|  | Transmittance at 450 nm (%) |  | 86.4 | 88.2 | 88.1 | 88.0 | 88.8 | 88.0 |
|  | YI value |  | 3.0 | 2.9 | 2.7 | 2.6 | 2.2 | 2.6 |
|  | Tg (° C.) |  | 236 | 239 | 228 | 257 | 257 | 248 |
|  | Water absorption ratio (%) |  | 0.9 | 1.0 | 1.1 | 0.9 | 0.9 | 1.4 |
|  | Deformation recovery (°) |  | 40 | 50 | 40 | 45 | 45 | 50 |
|  | Organic solvent resistance |  | B | A | A | A | C | C |

*1: 1,4-BAC: trans ratio 85%
*2: 1,3-BAC: trans ratio 30%
*3: Amount (parts by mass) relative to 100 parts by mass of polyimide resin

TABLE 3

|  |  |  | Example 12 | Example 13 | Example 14 | Example 15 | Comparative Example 3 |
|---|---|---|---|---|---|---|---|
| Polyimide resin | Tetracarboxylic acid component (mol %) | 6FDA | 80 | 50 | 80 | 80 | 50 |
|  |  | s-BPDA | 20 | 50 | — | — | — |
|  |  | CBDA | — | — | 20 | 20 | — |
|  |  | HPMDA | — | — | — | — | 50 |
|  | Diamine component (mol %) | 1,4-BAC *1 | 80 | 50 | — | — | — |
|  |  | 1,3-BAC *2 | — | — | 20 | 80 | — |
|  |  | MXDA | — | — | — | — | — |
|  |  | TFMB | 20 | 50 | 80 | 20 | 100 |
|  |  | HFBAPP | — | — | — | — | — |
|  | Amount of inorganic nanoparticles contained *3 |  | 0 | 0 | 0 | 0 | 0 |

TABLE 3-continued

|  |  | Example 12 | Example 13 | Example 14 | Example 15 | Comparative Example 3 |
|---|---|---|---|---|---|---|
| Evaluation | Tensile modulus (GPa) | 2.3 | 3.0 | 2.5 | 2.7 | 3.4 |
|  | Tensile strength (MPa) | 109 | 123 | 122 | 103 | 139 |
|  | Total light transmittance (%) | 90.7 | 90.3 | 91.3 | 91.3 | 91.0 |
|  | Transmittance at 400 nm (%) | 83.8 | 68.5 | 72.4 | 84.1 | 80.7 |
|  | Transmittance at 450 nm (%) | 89.6 | 88.2 | 86.8 | 89.4 | 89.2 |
|  | YI value | 2.5 | 2.6 | 2.2 | 2.5 | 2.0 |
|  | Tg (° C.) | 260 | 283 | 295 | 240 | 349 |
|  | Water absorption ratio (%) | 1.0 | 0.8 | 0.8 | 1.2 | 1.5 |
|  | Deformation recovery (°) | 55 | 40 | 60 | 40 | 80 |
|  | Organic solvent resistance | A | A | C | C | C |

*1: 1,4-BAC: trans ratio 85%
*2: 1,3-BAC: trans ratio 30%
*3: Amount (parts by mass) relative to 100 parts by mass of polyimide resin The abbreviations shown in the tables indicate the followings.
6FDA: 4,4'-(Hexafluoroisopropylidene)diphthalic anhydride [compound represented by the formula (a-1)]
s-BPDA: 3,3',4,4'-Biphenyltetracarboxylic dianhydride [compound represented by the formula (a-2-1)]
HPMDA: 1,2,4,5-Cyclohexanetetracarboxylic dianhydride [compound represented by the formula (a-3)]
CBDA: 1,2,3,4-Cyclobutanetetracarboxylic dianhydride [compound represented by the formula (a-4)]
1,4-BAC:trans ratio 85%: 1,4-Bis(aminomethyl)cyclohexane[cis:trans=15:85 (molar ratio); compound represented by the formula (b-1)]
1,3-BAC:trans ratio 30%: 1,3-Bis(aminomethyl)cyclohexane[cis:trans=70:30 (molar ratio); compound represented by the formula (b-2)]
MXDA: Metaxylylenediamine [compound represented by the formula (b-3)]
TFMB: 2,2'-Bis(trifluoromethyl)benzidine [compound represented by the formula (b-4)]
HFBAPP: 2,2-Bis[4-(4-aminophenoxy)phenyl]hexafluoropropane As can be seen from Tables 1 to 3, the polyimide films in Examples 1 to 13 are excellent in all of the colorlessness and transparency, heat resistance, and low water absorption properties while having an appropriate balance, and further are excellent in deformation recovery. The polyimide films in Examples 14 and 15 also are excellent in all of the colorlessness and transparency, heat resistance, and low water absorption properties while having an appropriate balance. Further, the polyimide films in Examples 10 and 11 can be improved in the modulus without impairing such a feature that they are excellent in the colorlessness and transparency, heat resistance, and low water absorption properties while having an appropriate balance. In contrast, the polyimide films in Comparative Examples 1 to 3 had a high water absorption ratio or a high YI value, and were not able to be excellent in all the colorlessness and transparency, heat resistance, and low water absorption properties.

REFERENCE SIGNS LIST

1: Polyimide film

The invention claimed is:
1. A polyimide film comprising a polyimide resin,
wherein the polyimide resin comprises a structural unit A derived from a tetracarboxylic dianhydride and a structural unit B derived from a diamine,
the structural unit A comprises a structural unit (A-1) derived from a compound represented by the following formula (a-1),

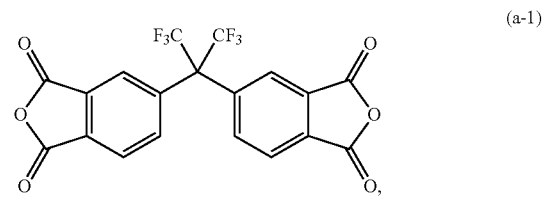

(a-1)

the structural unit B comprising a structural unit derived from an aliphatic diamine and a structural unit derived from an aromatic diamine:
wherein the structural unit derived from the aliphatic diamine contains at least one selected from the group consisting of a structural unit (B-1) derived from a compound represented by the following formula (b-1), a structural unit (B-2) derived from a compound represented by the following formula (b-2), and a structural unit (B-3) derived from a compound represented by the following formula (b-3):

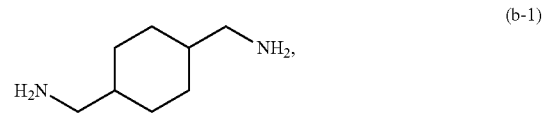

(b-1)

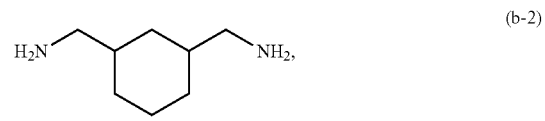

(b-2)

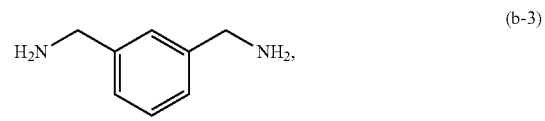

(b-3)

wherein the structural unit B further comprises a structural unit (B-4) derived from a compound represented by the following formula (b-4):

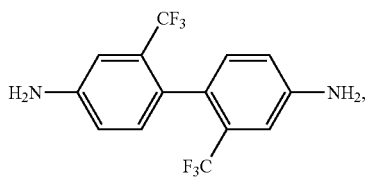

(b-4)

wherein the proportion of the total of the structural units derived from the aliphatic diamine in the structural unit B of the polyimide resin is 40 to 90 mol % therein,
wherein the proportion of the total of the structural units (B-1), (B-2), and (B-3) in the structural units derived from an aliphatic diamine is 90 mol % or more,
wherein the proportion of the structural unit (A-1) in the structural unit A is 30 mol % or more, and
wherein the polyimide film has a thickness of 10 to 250 μm.

2. The polyimide resin according to claim 1, wherein the structural unit A further comprises a structural unit (A-2) derived from a compound represented by the following formula (a-2):

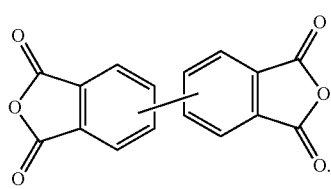

(a-2)

3. The polyimide resin according to claim 1, wherein the structural unit A further comprises a structural unit (A-4) derived from a compound represented by the following formula (a-4):

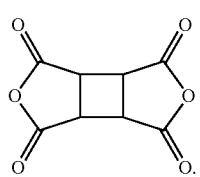

(a-4)

4. The polyimide resin according to claim 1, wherein the proportion of the structural unit (A-1) in the structural unit A is 40 mol % or more.

5. The polyimide resin according to claim 1, wherein the proportion of the structural unit derived from an aliphatic diamine in the structural unit B is from 40 to 80 mol %.

6. The polyimide resin according to claim 1, wherein the structural unit B comprises the structural unit (B-1), wherein the compound represented by the above formula (b-1) has a cis:trans ratio of 0:100 to 100:0.

7. The polyimide resin according to claim 1, wherein the structural unit B comprises the structural unit (B-2), wherein the compound represented by the above formula (b-2) has a cis:trans ratio of 0:100 to 100:0.

8. A polyimide film comprising a polyimide resin composition and inorganic nanoparticles,
wherein the polyimide resin comprises a structural unit A derived from a tetracarboxylic dianhydride and a structural unit B derived from a diamine, the structural unit A comprises a structural unit (A-1) derived from a compound represented by the following formula (a-1),

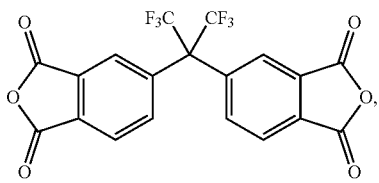

(a-1)

the structural unit B comprising a structural unit derived from an aliphatic diamine and a structural unit derived from an aromatic diamine:
wherein the structural unit derived from the aliphatic diamine contains at least one selected from the group consisting of a structural unit (B-1) derived from a compound represented by the following formula (b-1), a structural unit (B-2) derived from a compound represented by the following formula (b-2), and a structural unit (B-3) derived from a compound represented by the following formula (b-3):

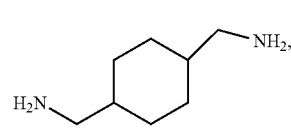

(b-1)

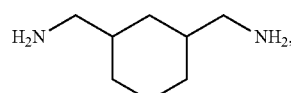

(b-2)

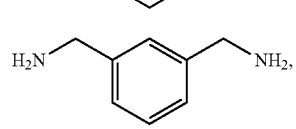

(b-3)

wherein the structural unit B further comprises a structural unit (B-4) derived from a compound represented by the following formula (b-4):

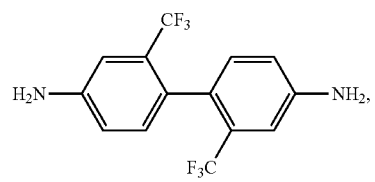

(b-4)

wherein the proportion of the total of the structural units derived from the aliphatic diamine in the structural unit B of the polyimide resin is 40 to 90 mol % therein,
wherein the proportion of the total of the structural units (B-1), (B-2), and (B-3) in the structural units derived from an aliphatic diamine is 90 mol % or more,
wherein the proportion of the structural unit (A-1) in the structural unit A is 30 mol % or more, and
wherein the polyimide film has a thickness of 10 to 250 μm.

9. The polyimide resin according to claim 8, wherein the structural unit A further comprises a structural unit (A-2) derived from a compound represented by the following formula (a-2):

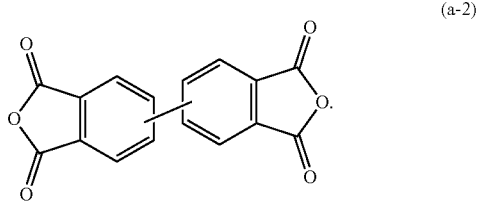
(a-2)

10. The polyimide resin according to claim 8, wherein the structural unit A further comprises a structural unit (A-4) derived from a compound represented by the following formula (a-4):

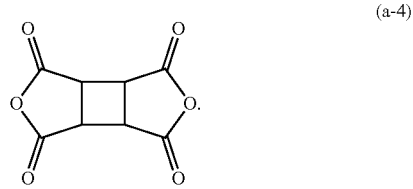
(a-4)

11. The polyimide resin according to claim 8, wherein the proportion of the structural unit (A-1) in the structural unit A is 40 mol % or more.

12. The polyimide resin according to claim 8, wherein the proportion of the structural unit derived from an aliphatic diamine in the structural unit B is from 40 to 80 mol %.

13. The polyimide resin according to claim 8, wherein the structural unit B comprises the structural unit (B-1), wherein the compound represented by the above formula (b-1) has a cis:trans ratio of 0:100 to 100:0.

14. The polyimide resin according to claim 8, wherein the structural unit B comprises the structural unit (B-2), wherein the compound represented by the above formula (b-2) has a cis:trans ratio of 0:100 to 100:0.

15. The polyimide resin composition according to claim 8, wherein the inorganic nanoparticles are metal oxide nanoparticles.

16. The polyimide resin composition according to claim 8, wherein the inorganic nanoparticles are aluminum oxide.

17. The polyimide resin composition according to claim 8, wherein the inorganic nanoparticles have an average particle diameter of 1 to 500 nm.

18. The polyimide resin composition according to claim 8, wherein the amount of the inorganic nanoparticles contained is from 10 to 60 parts by mass, relative to 100 parts by mass of the polyimide resin.

* * * * *